United States Patent
Herron, III

(10) Patent No.: US 8,609,226 B2
(45) Date of Patent: *Dec. 17, 2013

(54) HIGH STRENGTH LOW DENSITY MULTI-PURPOSE PANEL

(75) Inventor: Warren L. Herron, III, Gulf Breeze, FL (US)

(73) Assignee: Herron Intellectual Property Holdings, LLC, Gulf Breeze, FL (US)

(*) Notice: Subject to any disclaimer, the term of this patent is extended or adjusted under 35 U.S.C. 154(b) by 619 days.

This patent is subject to a terminal disclaimer.

(21) Appl. No.: 12/765,564

(22) Filed: Apr. 22, 2010

(65) Prior Publication Data

US 2010/0199588 A1 Aug. 12, 2010

Related U.S. Application Data

(63) Continuation-in-part of application No. 12/563,833, filed on Sep. 21, 2009, now abandoned, which is a continuation of application No. 11/370,072, filed on Mar. 7, 2006, now Pat. No. 7,591,114, which is a continuation-in-part of application No. 10/796,732, filed on Mar. 8, 2004, now Pat. No. 7,021,017.

(51) Int. Cl.
*B32B 3/00* (2006.01)

(52) U.S. Cl.
USPC .......... 428/166; 428/116; 428/131; 52/630; 52/660

(58) Field of Classification Search
USPC ......... 52/309.1, 316, 516, 630, 660; 428/178, 428/116, 117, 131, 166, 44, 57, 58
See application file for complete search history.

(56) References Cited

U.S. PATENT DOCUMENTS

| | | | | |
|---|---|---|---|---|
| 4,495,237 A | * | 1/1985 | Patterson | 428/178 |
| 5,256,007 A | * | 10/1993 | Allen | 405/302.4 |
| 5,470,641 A | * | 11/1995 | Shuert | 428/178 |
| 5,930,970 A | * | 8/1999 | De Le fevre | 52/630 |
| 6,199,334 B1 | * | 3/2001 | Malloy | 52/309.17 |
| 6,200,664 B1 | * | 3/2001 | Figge et al. | 428/178 |
| 7,021,017 B2 | * | 4/2006 | Herron | 52/516 |
| 7,591,114 B2 | * | 9/2009 | Herron, III | 52/516 |

* cited by examiner

*Primary Examiner* — Chi Q Nguyen

(74) *Attorney, Agent, or Firm* — Roy Kiesel Ford Doody & Thurmon

(57) ABSTRACT

A high strength low density panel. The panel is formed of sections. Each section will preferably have the shape of a cuboid or a prism. At least one face of each section is provided with a buttress. The sections are preferably inverted relative to each other. The sections are configured so that they share sidewalls with each adjacent section, which creates a series of braces extending across the panel. The prismatic sections are paired to form cuboids. These cuboids have a diagonal internal wall. The internal walls of the cuboids align in the panel to create braces that extend across the panel at an angle to the other braces. Finally, all of the buttresses are configured so that the buttress of adjacent and cater-corner sections meet their respective common section corners at substantially the same point.

23 Claims, 21 Drawing Sheets

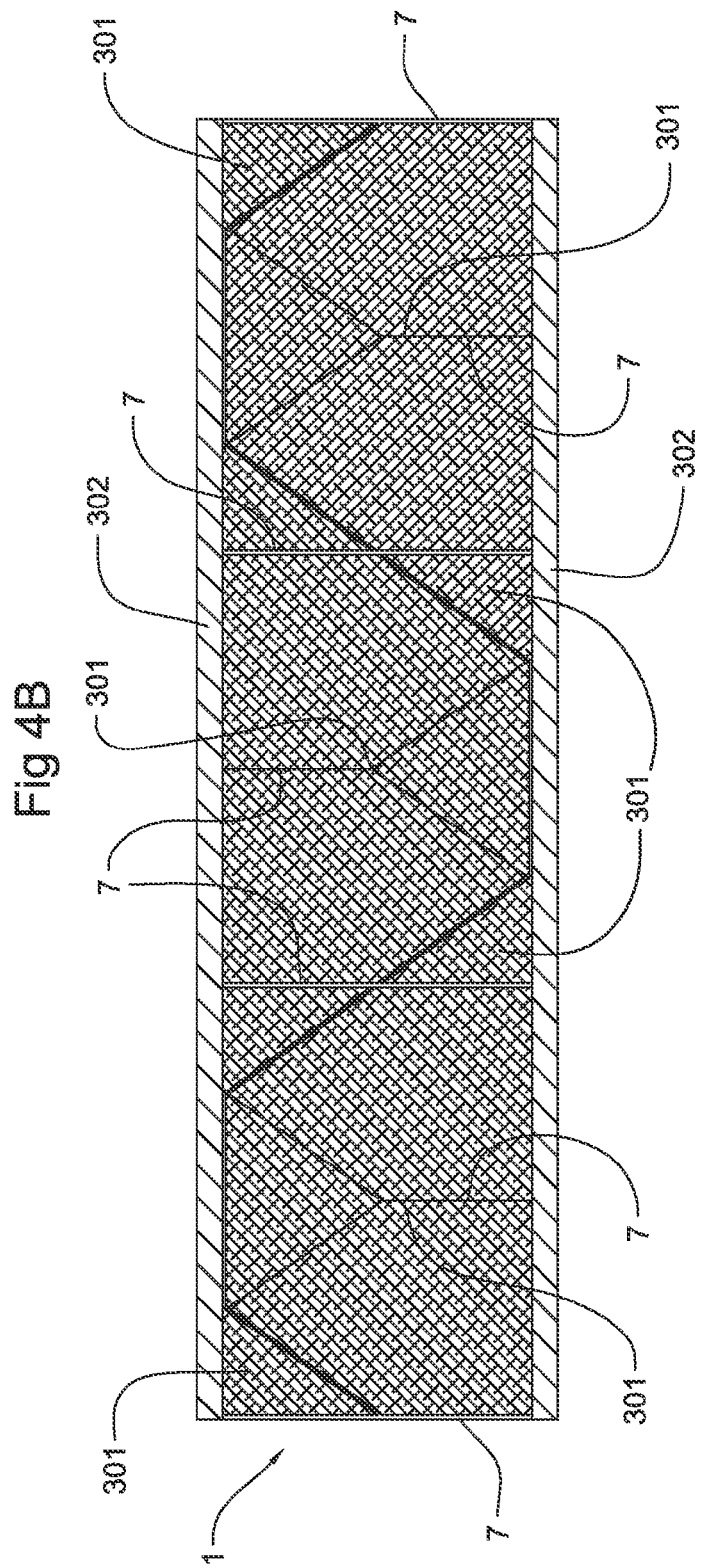

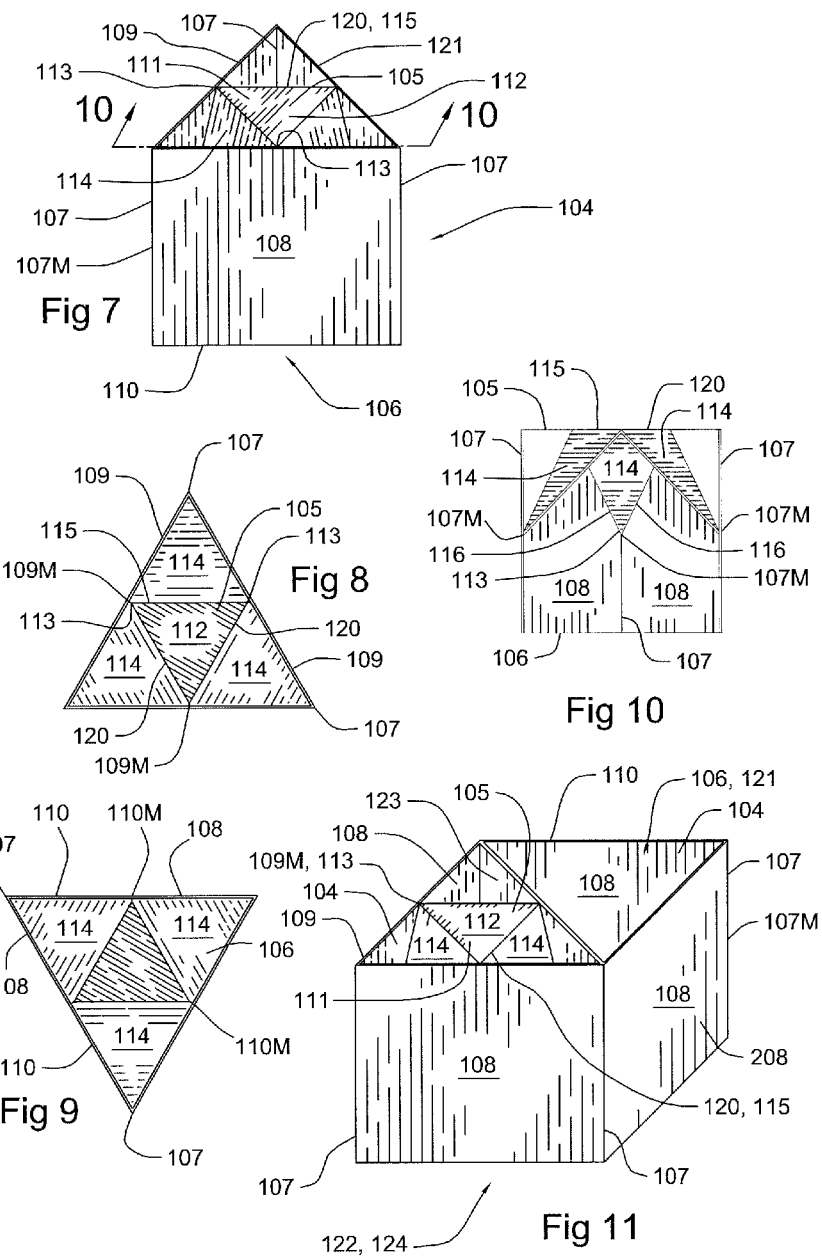

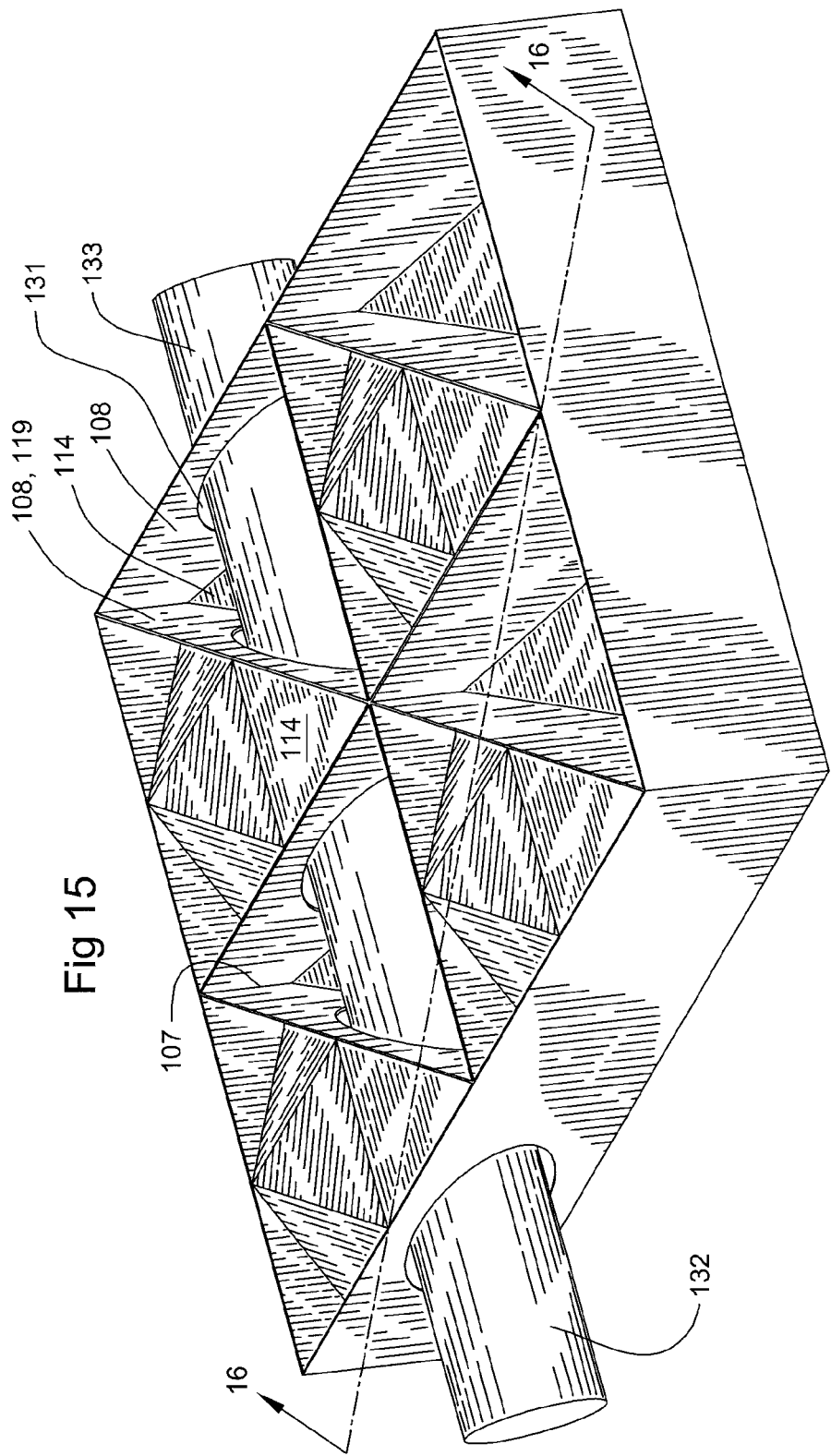

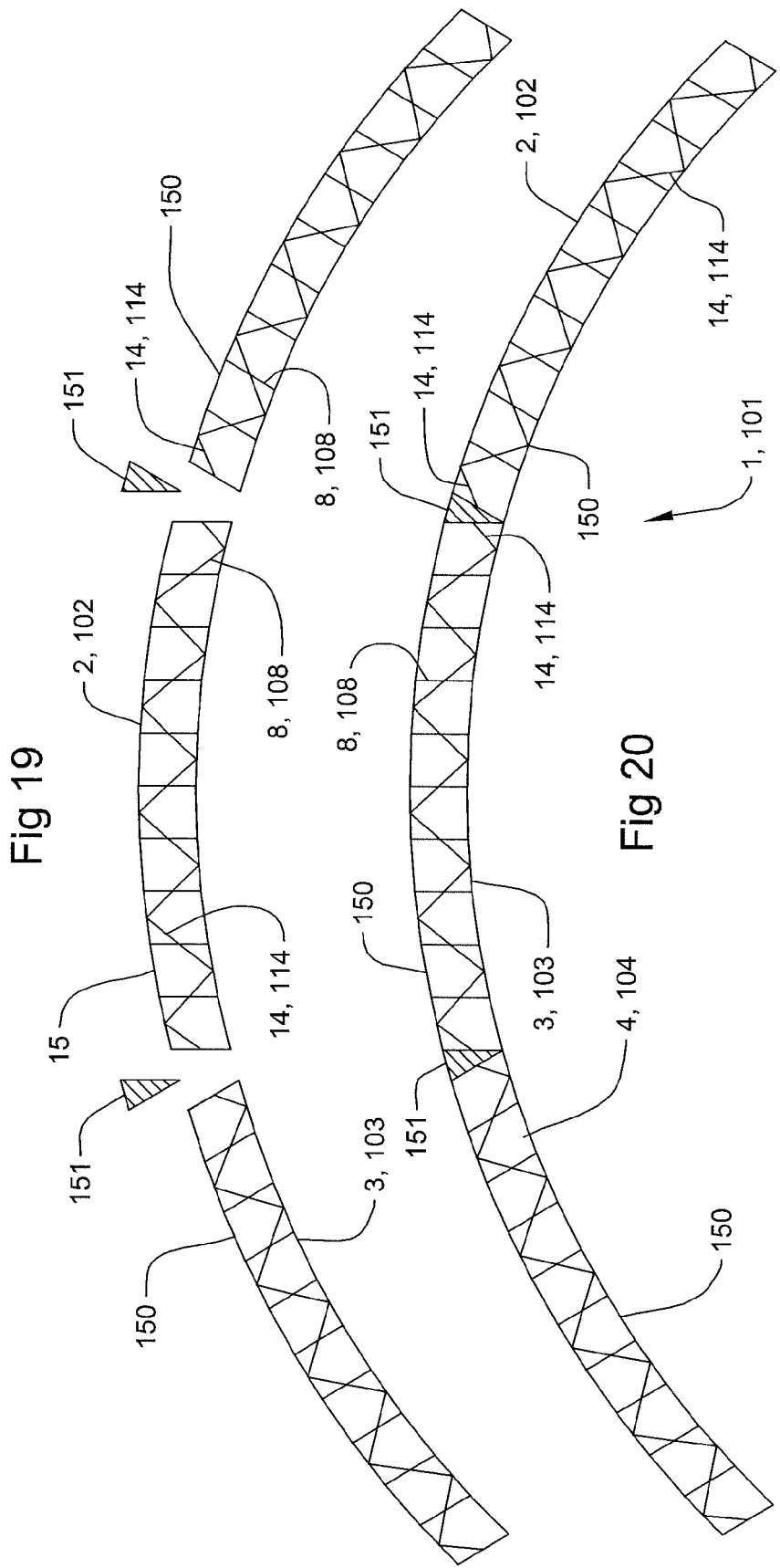

HIGH STRENGTH LOW DENSITY MULTI-PURPOSE PANEL

PRIORITY CLAIM

This application is a continuation-in-part of U.S. patent application Ser. No. 12/563,833, which is a continuation of U.S. patent application Ser. No. 11/370,072, now U.S. Pat. No. 7,591,114, which was a continuation-in-part of U.S. patent application Ser. No. 10/796,732, now U.S. Pat. No. 7,021,017, all of which are hereby incorporated by reference in their entirety.

BACKGROUND OF THE INVENTION

1. Field of the Invention

The invention relates to structural panels in general and to high strength low density panels in particular.

2. Prior Art

Construction panels that include void spaces in order to save on material and/or weight are well known in the prior art. However, many of these panels are deficient in at least one of several areas. The void spaces in many prior art panels are poorly designed. The internal shape of the void spaces are seldom configured to enhance the strength of the structure. Furthermore, the positioning of most prior art void spaces within the panel are not selected to facilitate reinforcement of the other void spaces. To the extent that the prior art panels have reinforcing members at all, the reinforcing members seldom extend across the entire panels in every direction. Thus, loads applied to an area of the prior art panels often must be borne by that area in isolation rather than distributing the load across the entire panel. Because of these design deficiencies, greater amounts of material are typically required to achieve the desired panel strength in the prior art. As a result, the prior art panels frequently either are not as economical as possible in terms of cost and weight or their desired strength is sacrificed to achieve weight and/or economic goals. Accordingly, a multipurpose panel meeting the following objectives is desired.

OBJECTS OF THE INVENTION

It is an object of the invention to provide a structural panel that is relatively strong.

It is another object of the invention to provide a structural panel that is relatively low in density.

It is another object of the invention to provide a structural panel that may be constructed with a relatively small amount of material.

It is still another object of the invention to provide a structural panel having reinforcing braces extending the length and width of the panel.

It is yet another object of the invention to provide a structural panel having reinforcing braces extending diagonally across the panel.

It is still another object of the invention to provide a structural panel having reinforcing members extending the depth of the panel.

It is still another object of the invention to provide a structural panel that may be easily curved to conform to a desired shape.

SUMMARY OF THE INVENTION

The invention comprises a high strength low density panel. The panel has an upper surface and a lower surface. The panel is comprised of a plurality of sections. In one preferred embodiment, the sections may be cuboids (i.e., boxes) preferably having right angles at all corners. In another preferred embodiment, the sections are prisms, most preferably having a triangular base. The sections will have sidewalls that extend from the upper face to the lower face of the panel. Sidewalls should most preferably be normal to the upper and lower surface of the panel. Each section will also preferably have a shored face and a free face, though both faces could be shored if desired. A buttress is provided at the shored face. In the cuboid sections, the buttress will preferably comprise a square sheet substantially co-planar with the shored face. In the prismatic sections, the sheet will preferably be triangular. In both preferred embodiments, the sheet will be offset relative to the shored face. A brace preferably extends from each edge of the sheet. Each brace will preferably extend to the mid-point of the corner of the section opposite the edge of the sheet from which the brace extends. Each brace will also preferably extend along the sidewalls of the section. Braces are preferably triangular in shape.

In the cuboid embodiment, the sections are preferably arranged in the panel in parallel rows and parallel columns. The rows and columns are preferably perpendicular. The cuboid sections are preferably arranged so that the sidewalls of adjacent sections are aligned to create braces running across the length and width of the panels. The cuboid sections are also preferably arranged so that each section is inverted relative to each adjacent section and commonly aligned with each cater-corner section.

In the prismatic embodiment, the sections are preferably arranged in the panel in pairs, with each section in the pair inverted relative to the other. Together, a pair of prismatic sections will form a cuboid. These cuboids are arranged in rows and columns. The rows will preferably be parallel and the columns will preferably be parallel. However, the rows and columns may or may not be perpendicular depending upon the angle of the prism faces. The external sidewalls of the cuboids formed by the section pairs will align with the sidewalls of adjacent cuboids to forms braces that run across the length and width of the panels. In the prismatic embodiment, there will be a sidewall, common to both prisms in the pair, that is internal to each cuboid as well. This internal sidewall will extend diagonally across each cuboid. The cuboids are preferably arranged in the panel so that the internal sidewalls of cater-corner cuboids align to form another set of braces running diagonally across the panel.

The sections are also configured so that the sections share their corners with adjacent and cater-corner sections. In the preferred embodiment, the braces are positioned so that braces from adjacent and cater-corner sections—cuboid and prismatic—meet the shared section corners at the same point in order to better distribute loads within the panel.

The panels may be curved to fit surfaces of variable curvature. Section perimeters may be varied to accommodate variations in the panel's curvature and/or it strength requirements.

BRIEF DESCRIPTION OF THE DRAWINGS

FIG. 4B is an unexploded view of the panel illustrated in FIG. 4A.

FIG. 7 is a perspective view of a preferred embodiment of a prismatic section.

FIG. 8 is a top view of a preferred embodiment of a prismatic section.

FIG. 9 is a bottom view of a preferred embodiment of a prismatic section.

FIG. 10 is a side cut-away view of a preferred embodiment of a prismatic section.

FIG. 11 is a perspective view of a preferred embodiment of two prismatic sections paired together to form a cuboid.

FIG. 15 is a perspective view of a preferred embodiment of a panel constructed with prismatic sections illustrating apertures and reinforcing rods/conduits running through the panel.

FIG. 19 is a side cut-away and exploded view of a preferred embodiment of a curved panel having sections and joints.

FIG. 20 is a side cut-away view of the curved panel of FIG. 19 shown assembled.

DETAILED DESCRIPTION OF THE PREFERRED EMBODIMENT

Figure 1:
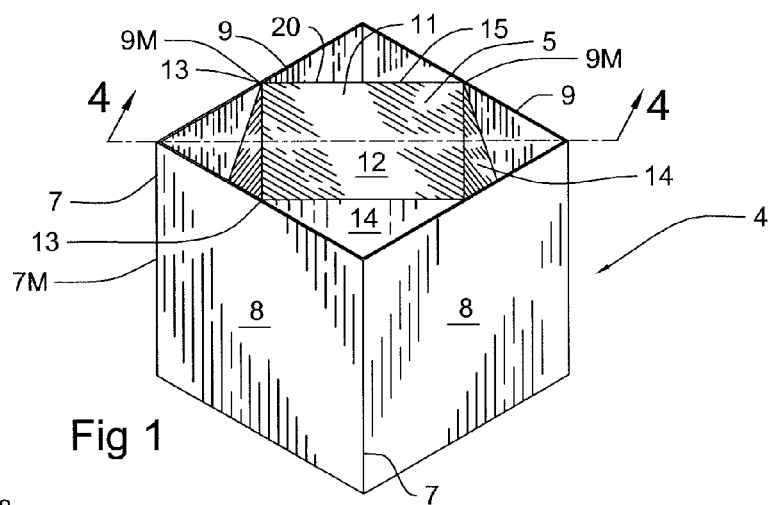
FIG. 1 is a perspective view of a preferred embodiment of a cuboid section.
Figure 2:
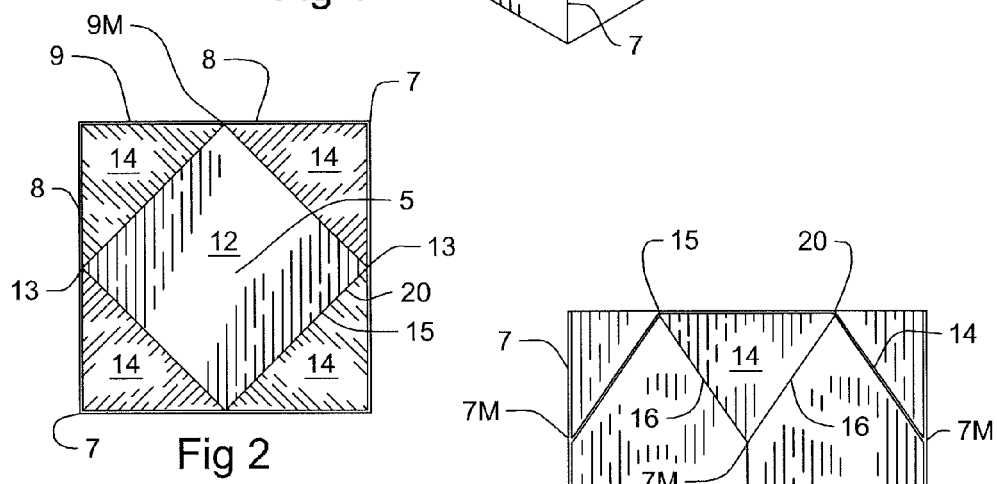
FIG. 2 is a top view of a preferred embodiment of a cuboid section.
Figure 4:
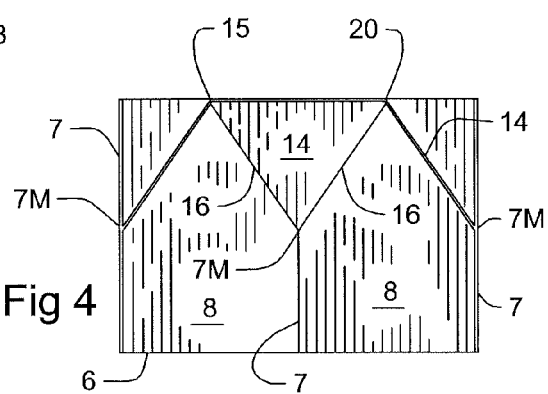
FIG. 4 is a side cut-away view of a preferred embodiment of a cuboid section
Figure 3:
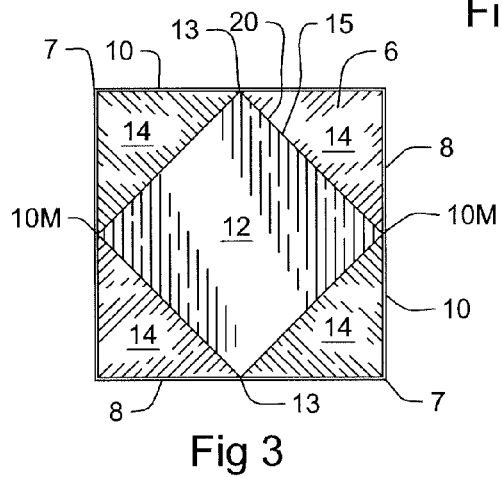
FIG. 3 is a bottom view of a preferred embodiment of a cuboid section.
Figure 4A:
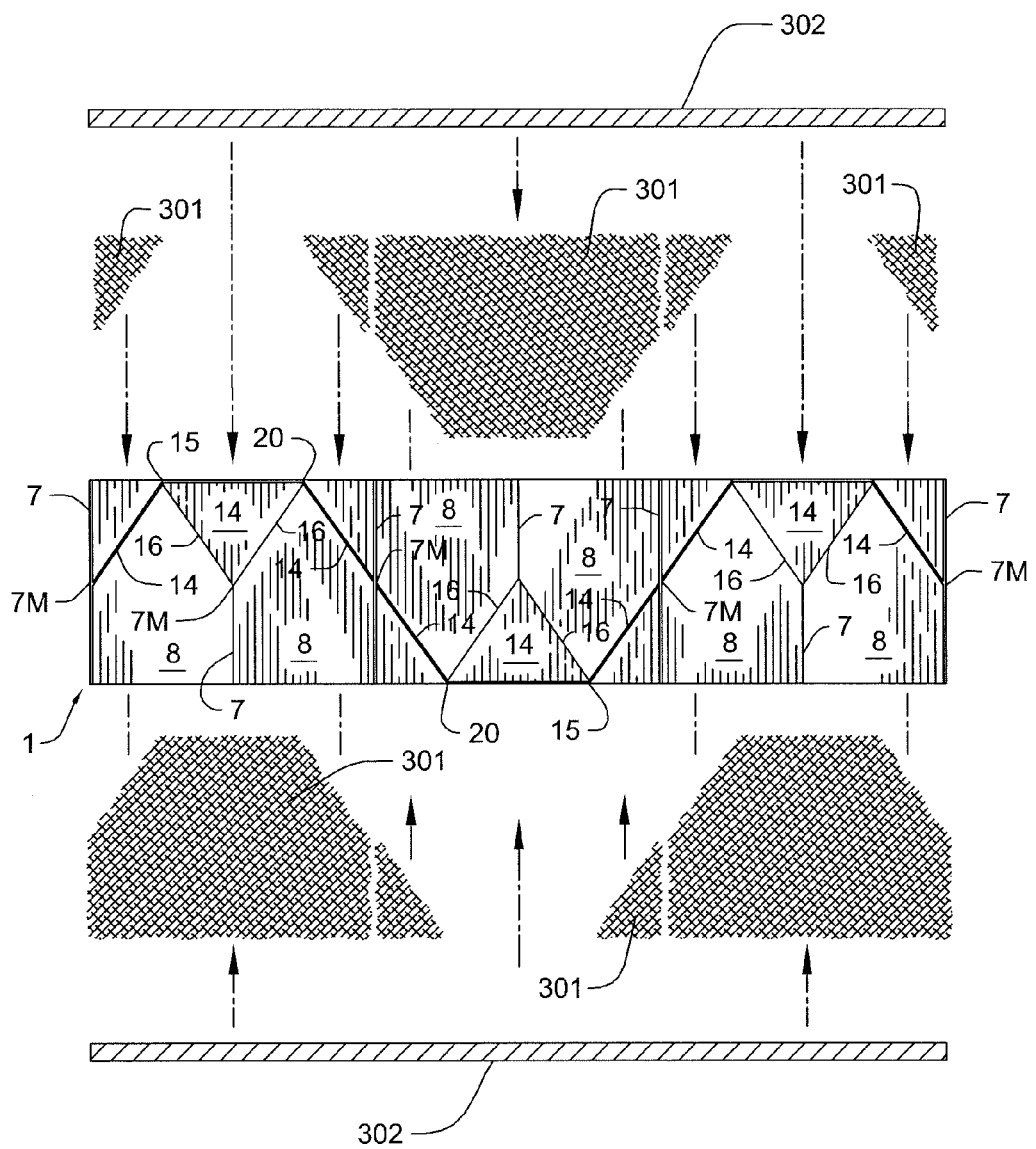
FIG. 4A is a side cut-away view of a panel constructed with cuboid sections and with laminate upper and lower layers and section fillings shown in exploded view.
Figure 5:
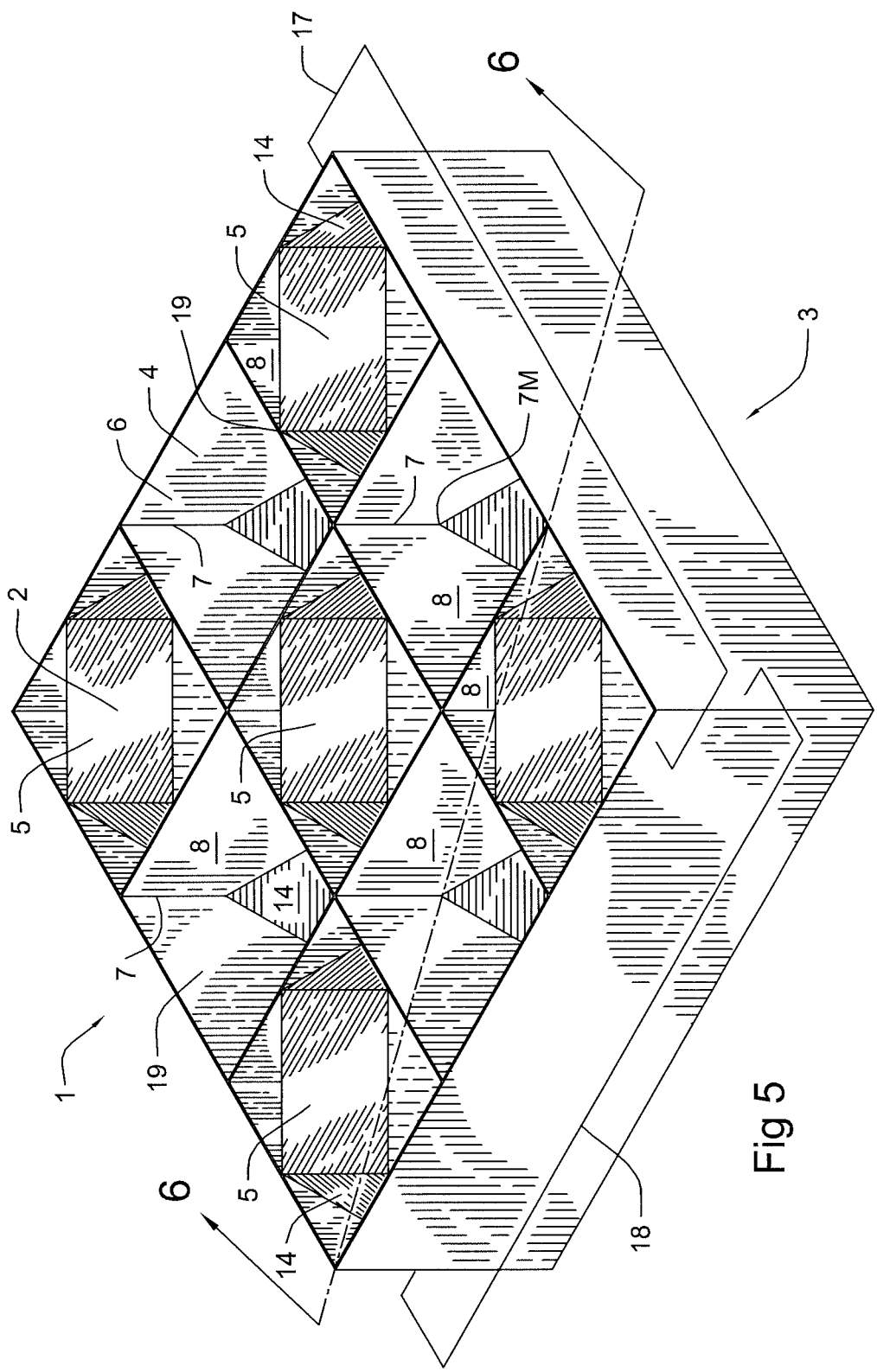
FIG. 5 is a perspective view of a preferred embodiment of a panel constructed with cuboid sections.
Figure 6:
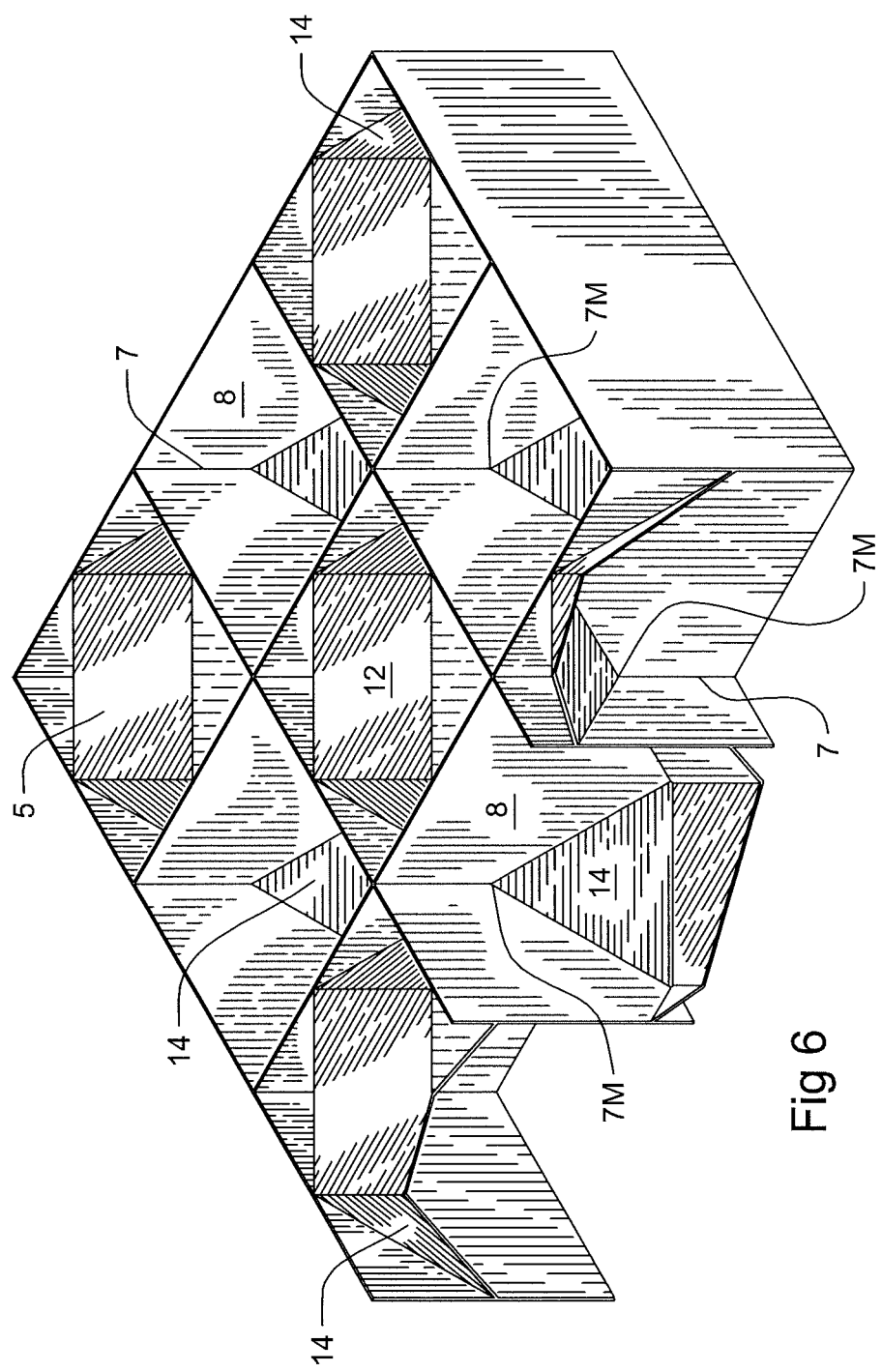
FIG. 6 is a perspective, partial cut-away view of a preferred embodiment of a panel constructed with cuboid sections.

The invention comprises a high strength low density panel 1. Panel 1 has an upper face 2 opposite a lower face 3. Panel 1 is preferably formed from a plurality of substantially hollow sections 4.

In one preferred embodiment, sections 4 are cuboids, preferably rectangular cuboids or square cuboids and most preferably cubes. Each section 4 preferably has a shored face 5 opposite a free face 6. Though sections 4 will be described below as having a free face 6 and a shored face 5, it will be appreciated that sections 4 could be formed with two shored faces 5 and no free face 6 by simply making the face opposite shored face 5 mirror shored face 5.

In the preferred cuboid embodiment, each section 4 will further comprise four corners 7 extending between shored face 5 and free face 6. Each corner 7 has a midpoint 7M. Four sidewalls 8 of material extend from each corner 7 to each adjacent corner 7. The four sidewalls 8, shored face 5, and free face 6 form a cuboid.

The edge of each sidewall 8 that is co-planar with the shored face 5 is referred to as the shored border 9. Similarly, the edge of each sidewall 8 that is co-planar with the free face 6 is referred to as the free border 10. Each shored border 9 has a midpoint 9M, and each free border has a midpoint 10M.

Each section 4 is preferably provided with at least one buttress 11. In the preferred embodiment involving cuboid sections 4, buttress 11 is comprised of a sheet 12 of material, preferably solid. In the cuboid embodiment, sheet 12 is preferably rectangular and most preferably square. Sheet 12 will preferably be substantially co-planar with shored face 5. In this embodiment, sheet 12 will have four corners 13. Each corner 13 will preferably be positioned at or about each midpoint 9M of each shored border 9. By positioning sheet 12 in this fashion, one of the corners 7 of section 4 will be positioned between each adjacent pair of corners 13 of sheet 12. Sheet 12 will preferably be integrally joined with sidewalls 8 at about each of midpoints 9M.

Buttress 11 will preferably further comprise braces 14. Each brace 14 will preferably extend from an edge 20 of sheet 12 and most preferably from a pair of adjacent corners 13 of sheet 12. Each brace 14 will extend from sheet 12 to the one of corners 7 of section 4 positioned between adjacent corners 13 of sheet 12. Each brace 14 will preferably meet each corner 7 of section 4 at about the midpoint 7M of corner 7. Each brace 14 will preferably be integrally joined with a corner 7 at midpoint 7M. Braces 14 are preferably substantially triangular in shape. Triangular braces 14 preferably have a base 15 that is co-linear with and integrally connected to an edge 20 of sheet 12. Triangular braces 14 further have two sides 16 that extend from base 15 to about the midpoint 7M of the corner 7 opposite base 15. Sides 16 preferably extend along sidewalls 8. Most preferably sides 16 are integrally connected with sidewalls 8.

Each buttress 11 is preferably comprised of a plurality of braces 14. Braces 14 will preferably extend from each edge 20 of sheet 12. However, in one embodiment, braces 14 extend from only two of the four edges 20 of sheet 12 in order to save material. In this embodiment, braces 14 will preferably extend from edges 20 on opposite sides of sheet 12.

It will be appreciated that loads applied to buttress 11 will be distributed to sidewalls 8 where sheet 12 meets shored borders 9 at about midpoint 9M and where braces 14 extend along and are connected to sidewalls 8. Similarly, loads applied to buttress 11 will be distributed to corners 7 where braces 14 meet corners 7 at about midpoint 7M. In this way, loads applied perpendicularly (or otherwise at an angle) to shored face 5 will be distributed to the structures of panel 1 best suited to bear such loads, corners 7 and sidewalls 8.

It will also be appreciated that loads applied to sidewalls 8 and corners 7 will be distributed to buttress 11 via braces 14 and via the connection between sheet 12 and shored border 9. Buttress 11 will, in turn, distribute such loads to other sidewalls 8 and corners 7. In this way, loads applied perpendicularly (or otherwise at an angle) to sidewalls 8 and corners 7 will be distributed to buttresses 11 and to the other sidewalls 8 and corners 7.

Sidewalls 8 and buttresses 11 will typically be solid continuous panels of material. However, sidewalls 8 and buttresses 11 may include apertures 31 in order to decrease the amount of material required to construct panel 1. Apertures 31 may also be utilized in order to allow conduits 32 for wiring, air or other gases, hydraulic lines, or plumbing to be run through panel 1. By positioning and sizing apertures 31 appropriately, apertures 31 may provide passage to conduits 32 through sidewalls 8 and/or buttresses 11 while avoiding the braces 14 of buttresses 11. Though shown only in straight lines, elbow joints could be provided in conduits 32 in order to allow wiring, plumbing or hydraulic lines to change directions within panel 1 or to exit panel 1 entirely.

Reinforcing rods 33 may also be run though apertures, as desired. Reinforcing rods 33 will preferably match the shape of apertures 31 which, though shown as round, may be triangular, square, diamond shaped, or any other shape as may be convenient. Reinforcing rods 33 may be joined to sidewalls 8 by conventional means such as adhesives, rotational (friction) welding, molding them in place during construction, or other such methods known to those of skill in the art. Reinforcing rods 33 may be solid or hollow. When hollow, they could serve as reinforcing rods 33 and conduits 32. Reinforcing rods 33 will brace and stiffen sidewalls 8 and serve to generally reinforce panel 1.

Reinforcing rods 33 may be used to join adjacent segments of panel 1 or to join panel 1 to adjacent structures. Male or female pieces could be provided in the adjacent panel or structure, configured to engage the reinforcing rods 33 of panel 1. The mated pieces could be joined by threading, welding, adhesives, or other conventional fastening means, thereby joining panel 1 to the desired object.

As noted above panel 1 is formed of a plurality of sections 4. Sections 4 are preferably arranged in a series of substantially parallel columns 17 and substantially parallel rows 18. Rows 18 and columns 17 are preferably substantially perpendicular to each other. This arrangement will preferably align sidewalls 8 of each section 4 with the sidewalls 8 of adjacent sections 4 in rows 18 and columns 17. Thus, the sidewalls 8 will foam interconnected and substantially perpendicular braces 19 extending across panel 1. Braces 19 will serve to distribute loads applied to panel 1 across the entire panel.

Sections 4 are preferably oriented in an inverse pattern relative to each other. In this configuration, starting with any section 4, each adjacent section 4 would preferably have an opposite orientation. That is, if the selected section 4 is oriented so that its shored face 5 is in the upper face 2 of panel 1, each adjacent section 4 will be oriented so that its shored face 5 is in the lower face 3 of panel 1. Adjacent sections 4 are those that share one side sidewall 8 and two corners 7.

In the preferred inverse configuration, starting with any section 4, each cater-corner section 4 would preferably have the same orientation as the starting section 4. That is, if the selection section 4 is oriented so that its shored face 5 is in the upper face of panel 1, each cater-corner section 4 will be oriented so that its shored face is also in the upper face 2 of panel 1. Cater-corner sections 4 are those that share one corner 7 and no sidewalls 8.

Arranging the sections 4 in the manner described above will allow buttresses 11 to reinforce the entire panel 1. Upper face 2 and lower face 3 should be equally strong. However, it will be appreciated that when anticipated load circumstances indicate, sections 4 may be commonly oriented so that shored faces 5 are all in upper face 2 or lower face 3 of panel 1 in order to provide additional reinforcement to one side of panel 1. In this embodiment, braces 14 will preferably extend from shored face 5 to free face 6, rather than stopping at midpoint 7M, as is preferred when the orientation of sections 4 alternates.

One of the advantages of the preferred design (alternating sections) is that braces 14 from adjacent and cater-corner cuboid sections 4 will meet common corners 7 at substantially the same point, namely midpoint 7M. This will facilitate distribution of loads applied to panel 1. By way of example, the reader may consider a load applied to a single shored face 5 of one of sections 4 of panel 1. Rather than braces 14 merely transferring the load to corners 7 and sidewalls 8 of the section 4 containing shored face 5, by having adjacent braces 14 meet at a common point on shared corners 7, the load will be readily transferred to the shored faces 5 of adjacent sections 4, which will preferably be on the opposite side of panel 1 from the shored face 5 to which the load was directly applied. Thus, a load applied to the shored face 5 of a single section 4 will be supported by a base that includes the shored faces 5 of the four adjacent sections 4.

In another embodiment, sections 4 alternate, but braces 14 will preferably extend from shored face 5 to free face 6, rather than stopping at midpoint 7M. Here, the braces 14 will not meet at midpoint 7M, but each common corner 7 will be shored by four braces 14: two at each end of each corner 7. This will also result in four braces 14 running diagonally across each sidewall 8: two braces 14 on each face of each sidewall 8. The resulting design should have high crush and shear resistance.

In another preferred embodiment, sections 104 are prisms, having triangular bases 121. Each section 104 preferably has a shored face 105 opposite a free face 106. The shored and free faces 105, 106 are the bases 121 of the prism. Though sections 104 will be described below as having a free face 106 and a shored face 105, it will be appreciated that sections 104 could be formed with two shored faces 105 and no free face 106 by simply making the face opposite shored face 105 mirror shored face 105.

In the preferred prismatic embodiment, each section 104 will further comprise three corners 107 extending between shored face 105 and free face 106. Each corner 107 has a midpoint 107M. Three sidewalls 108 of material extend from each corner 107 to each adjacent corner 107. The three sidewalls 108, shored face 105, and free face 106 form a prism.

Sidewalls 108 and buttresses 111 will typically be solid continuous panels of material. However, sidewalls 108 and buttresses 111 may include apertures 131 in order to decrease the amount of material required to construct panel 101. Apertures 131 may also be utilized in order to allow conduits 132 for wiring, air or other gases, hydraulic lines, or plumbing to be run through panel 101. By positioning and sizing apertures 131 and/or buttresses 111 appropriately, apertures 131 may provide passage to conduits 132 through sidewalls 108 and/or buttresses 111 while avoiding the braces 114 of buttresses 111. Though conduits 132 are shown only in straight lines, elbow joints could be provided in conduits 132 in order to allow wiring, plumbing or hydraulic lines to change directions within panel 101 or to exit panel 101 entirely.

Reinforcing rods 133 may also be run though apertures, as desired. Reinforcing rods 133 will preferably match the shape of apertures 131 which, though shown as round, may be triangular, square, diamond shaped, or any other shape as may be convenient. Reinforcing rods 133 may be joined to sidewalls 108 by conventional means such as adhesives, rotational (friction) welding, molding them in place during construction, or other such methods known to those of skill in the art. Reinforcing rods 133 may be solid or hollow. When hollow, they could serve as reinforcing rods 133 and conduits 132. Reinforcing rods 133 will brace and stiffen sidewalls 108 and serve to generally reinforce panel 101.

Reinforcing rods 133 may be used to join adjacent segments of panel 101 or to join panel 101 to adjacent structures. Male or female pieces could be provided in the adjacent panel or structure, configured to engage the reinforcing rods 133 of panel 101. The mated pieces could be joined by threading, welding, adhesives, or other conventional fastening devices, thereby joining panel 101 to the desired object.

The edge of each sidewall 108 that is co-planar with the shored face 105 is referred to as the shored border 109. Similarly, the edge of each sidewall 108 that is co-planar with free face 106 is referred to as the free border 110. Each shored border 109 has a midpoint 109M, and each free border has a midpoint 110M.

Each section 104 is preferably provided with at least one buttress 111. In the preferred embodiment involving prismatic sections 104, buttress 111 is comprised of a sheet 112 of material, preferably solid. In the prismatic embodiment, sheet 112 is preferably triangular. Sheet 112 will most preferably have the shape of an equilateral triangle, though using sheets 112 with the shape of a right triangle or other triangular shapes may be desirable for certain specialized load applications. Sheet 112 will preferably be substantially co-planar with shored face 105. In this embodiment, sheet 112 will have three corners 113. Each corner 113 will preferably be positioned at or about each midpoint 109M of each shored border 109. By positioning sheet 112 in this fashion, one of the corners 107 of section 104 will be positioned between each adjacent pair of corners 113 of sheet 112. Sheet 112 will preferably be integrally joined with sidewalls 108 at about each of midpoints 109M.

Buttress 111 will preferably further comprise braces 114. Each brace 114 will preferably extend from an edge 120 of sheet 112 and most preferably from a pair of adjacent corners 113 of sheet 112. Each brace 114 will extend from sheet 112 to the one of corners 107 of section 104 positioned between adjacent corners 113 of sheet 112. Each brace 114 will preferably meet each corner 107 of section 104 at about the midpoint 107M of corner 107. Each brace 114 will preferably be integrally joined with a corner 107 at midpoint 107M. Braces 114 are preferably substantially triangular in shape. Triangular braces 114 preferably have a base 115 that is co-linear with and integrally connected to an edge 120 of sheet 112. Triangular braces 114 further have two sides 116 that extend from base 115 to about the midpoint 107M of the corner 107 opposite base 115. Sides 116 preferably extend along sidewalls 108. Most preferably sides 116 are integrally connected with sidewalls 108.

Each buttress 111 is preferably comprised of a plurality of braces 114. Braces 114 will preferably extend from each edge 120 of sheet 112.

It will be appreciated that the comments above regarding load distribution throughout sheet 1 in the cuboid embodiment of sections 4 will apply equally to sheets 101 comprised of the prismatic embodiments of sections 104.

In the prismatic embodiment, prismatic sections 104 are preferably paired together so that each pair 122 of sections 104 together forms a cuboid 124. Two of the three sidewalls 108 of each prismatic section 104 will form the exterior sidewalls 208 for the cuboid 124. The third sidewall 108 of each prismatic section 104 in pair 122 will be shared between the two prismatic sections 104.

This shared internal wall 123 will extend diagonally across cuboid 124. Cuboids 124 are preferably arranged within panel 101 in a series of substantially parallel columns 117 and parallel rows 118. Rows 118 and columns 117 may be substantially perpendicular to each other or they may intersect at angles greater or less than ninety degrees. This arrangement will preferably align sidewalls 208 of each cuboid 124 with the sidewalls 208 of adjacent cuboids 124 in rows 118 and columns 117. Thus, the sidewalls 208 will form interconnected braces 119 extending across panel 101. The braces formed by sidewalls 208 may or may not be substantially perpendicular to each other, depending upon the relative angles of rows 118 and columns 117.

Braces 119 formed by rows 118 and columns 117 in the panel 101 employing the prismatic embodiment of sections 104 will be quite similar to braces 19 formed by rows 18 and columns 17 in the panel 1 employing the cuboid embodiment of section 4. However, shared internal walls 123 present in the cuboids 124 of the panel 101 employing prismatic sections 104 will create an additional set of braces 119. In the prismatic embodiment, cuboids 124 will preferably be positioned so that shared internal walls 123 of cater-corner cuboids 124 will be aligned. This will create an additional set of braces 119 running diagonally across panel 101. All braces 119 will serve to distribute loads applied to panel 101 across the entire panel.

Prismatic sections 104 are preferably oriented in an inverse pattern relative to each other within pairs 122 and cuboids 124. In this configuration, starting with any section 104, its pair mate would preferably have the opposite orientation. That is, if the selected section 104 is oriented so that its shored face 105 is in the upper face 102 of panel 101, its pair mate will be oriented so that its shored face 105 is in the lower face 103 of panel 101. Preferably all cuboids will have the same orientation. If so, this will result in every section 104 within panel 1 having an opposite orientation relative to all of its adjacent neighboring sections 104. Adjacent sections 104 are those that share one sidewall 108 and two corners 107.

Arranging the sections 104 in the manner described above will allow buttresses 111 to reinforce the entire panel 101. Upper face 102 and lower face 103 should be equally strong. However, it will be appreciated that when anticipated load circumstances indicate, sections 104 may be commonly oriented so that shored faces 105 are all in upper face 102 or lower face 103 of panel 101 in order to provide additional reinforcement to one side of panel 101. In this embodiment, braces 114 will preferably extend from shored face 105 to free face 106, rather than stopping at midpoint 107M, as is preferred when the orientation of sections 104 alternates.

Figure 12:
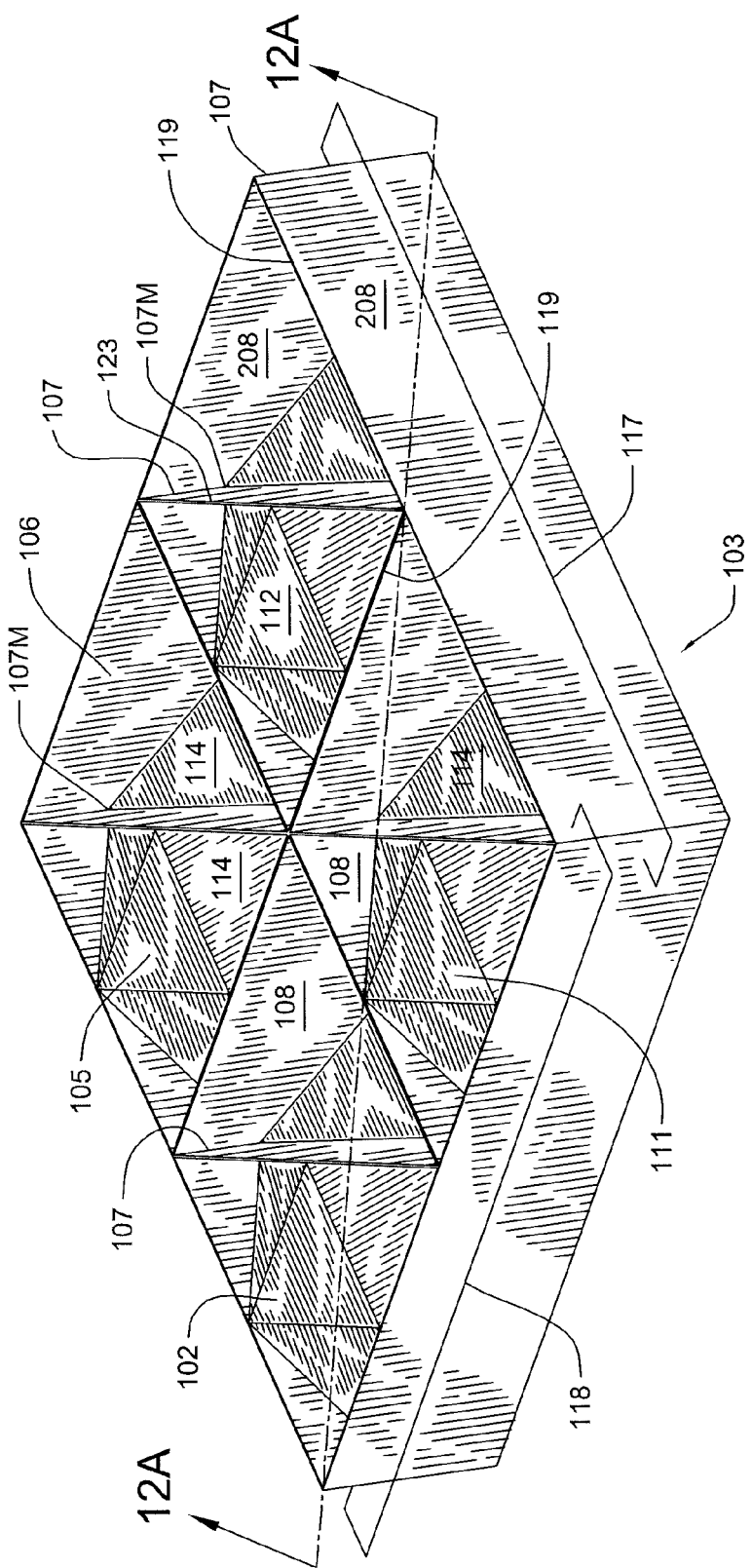
FIG. 12 is a perspective view of a preferred embodiment of a panel constructed with prismatic sections.
Figure 12A:
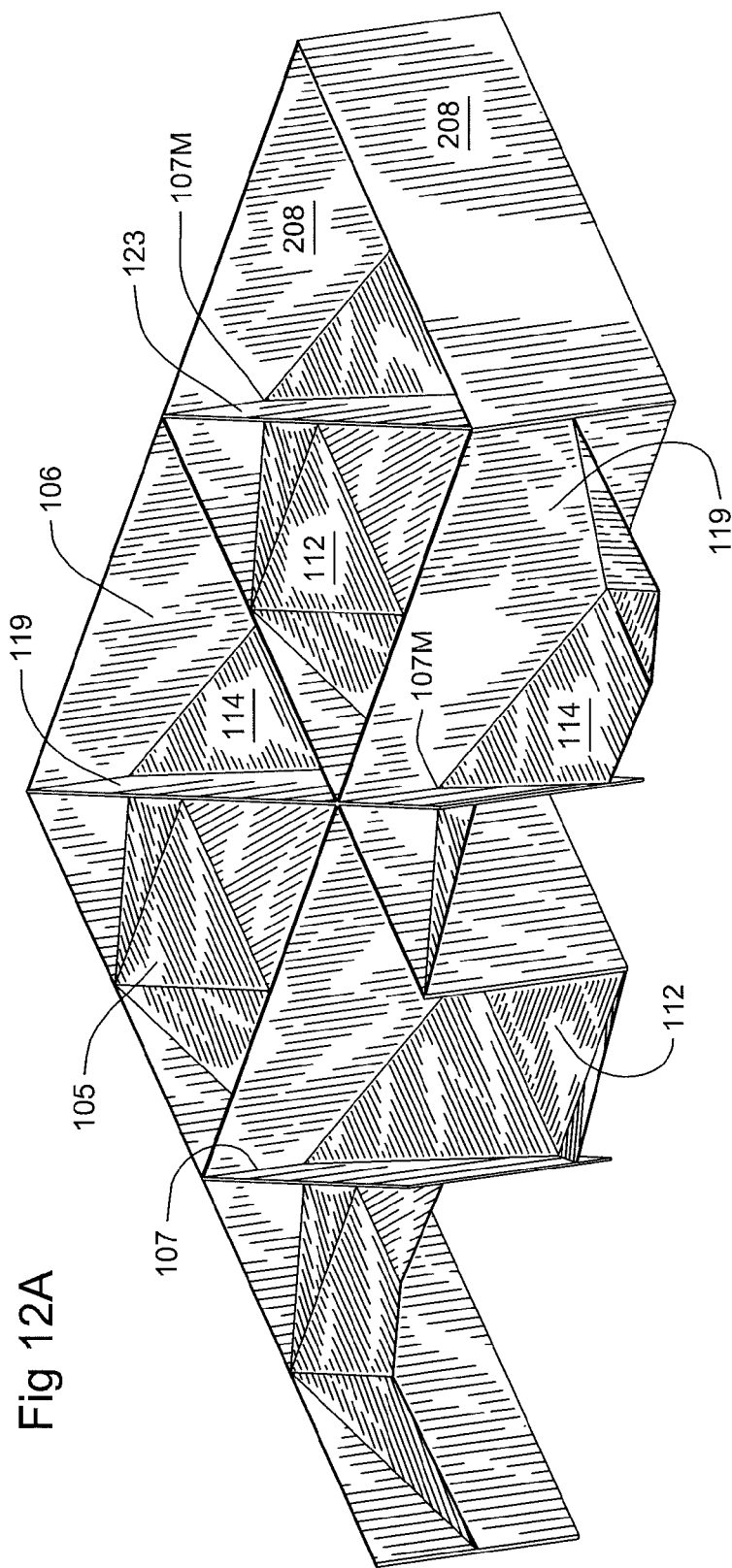
FIG. 12A is a perspective, partial cut-away view of a preferred embodiment of a panel constructed with prismatic sections.

One of the advantages of the preferred design (alternating sections) is that braces 114 from adjacent and cater-corner prismatic sections 104 will meet common corners 107 at substantially the same point, namely midpoint 107M. This will facilitate distribution of loads applied to panel 101. By way of example, the reader may consider a load applied to a single shored face 105 of one of sections 104 of panel 101. Rather than braces 114 merely transferring the load to corners 107 and sidewalls 108 of the section 104 containing shored face 105, by having adjacent braces 114 meet at a common point on shared corners 107, the load will be readily transferred to the shored faces 105 of adjacent and cater-corner sections 104, which will preferably be on the opposite side of panel 101 from the shored face 105 to which the load was directly applied. Thus, a load applied to the shored face 105 of a single section 104 will be supported by a base that includes the shored faces 105 of the three adjacent sections 104 and three of the cater-corner sections 104. See, FIG. 12.

In another embodiment, sections 104 alternate, but braces 114 will preferably extend from shored face 105 to free face 106, rather than stopping at midpoint 107M. Here, the braces 114 will not meet at midpoint 107M, but each common corner 107 will be shored by six braces 114: three at each end of each corner 107. This will also result in four braces 114 running diagonally across each sidewall 108: two braces 114 on each face of each sidewall 108. The resulting design should have high crush and shear resistance.

Panels 1, 101 may be easily adapted for use with curved surfaces. When only upper surface 2, 102 or lower surface 3, 103 is to curve, the height of corners 7, 107 may be varied to vary the height of sidewalls 8, 108. Such variations will induce a slope to shored faces 5, 105 and free faces 6, 106. However, it will be appreciated that the shored borders 9, 109 of any section 4, 104 should preferably remain co-planar. Similarly, the free borders 10, 110 of any section 4, 104 will preferably remain co-planar as well. This will allow any slope of free face 6, 106 and especially shored face 5, 105 to be constant within each section 4, 104.

When panels 1, 101 are constructed by hand or other one-off construction methods, sidewalls 8, 108 will preferably be as close to normal to upper surface 2, 102 and lower surface 3, 103, as practical regardless of curvature. To facilitate this, the length of the perimeter of shored face 5, 105 and free face 6, 106 may be varied across panel 1, 101, though shored face 5, 105 and free face 6, 106 in any one section 4, 104 will preferably be equal in most applications. When the length of the perimeter of shored face 5, 105 and free face 6, 106 decrease relative to other sections 4, 104 in panel 1, 101, the results will be (A) a smaller section 4, 104 that occupies less surface area of panel 1, 101; (B) more sections 4, 104 per square inch of upper surface 2, 102 and lower surface 3, 103; (C) corners 7, 107 and sidewalls 8, 108 that remain substantially normal to surfaces 2, 102 and 3, 103; and (D) a general increase in strength in panel 1, 101 (more sections per square inch generally equating to increased strength) in areas of curvature to compensate for the increased stresses such curved areas must bear in many structures.

When panel 1, 101 is made using a mold, as will be typical when multiple panels 1, 101 are desired, it will be preferable to keep sidewalls 8, 108 vertical relative to the mold—i.e. parallel and perpendicular to each other—so that the mold may be opened easily. This poses no difficulties when panel 1, 101 is flat. However, when panel 1, 101 is curved, keeping sidewalls 8, 108 parallel will result in sidewalls 1, 101 being displaced from normal relative to upper and lower surfaces 2, 102 and 3, 103. Deviation of sidewalls 8, 108 from normal will also result in a deformation of the buttresses 11, 111 and braces 14, 114 which, together with sidewalls 8, 108 make up the individual sections 4, 104. Depending upon the degree of deviation, the loads panel 1, 101 is intended to bear, and the direction(s) from which those loads are expected to be applied, the deviation and deformation may be acceptable or even desirable. However, when loads are expected to be applied primarily normal to surfaces 2, 102 and 3, 103, it will often be desirable for sidewalls 8, 108 to remain as close to normal to surfaces 2, 102 and 3, 103 as practicable. To accomplish this when panel 1, 101 is curved; the inventor contemplates breaking panel 1, 101 into segments 150 during construction. The number of segments 150 a particular panel will need to be separated into will depend upon a variety of factors including the degree of curvature of panel 1,101; the materials from which panel 1, 101 is constructed; the dimensions of panel 1, 101; and the intended application of panel 1, 101. However, all other things being equal, the inventor contemplates separating a curved panel 1, 101 into segments 150 with sufficient frequency to avoid sidewalls 8, 108 deviating more than about 10 degrees from normal relative to surface 2, 102 and 3, 103.

It will be appreciated that if the sidewalls 8, 108 of one curved panel segment 150 are parallel and perpendicular to each other and normal to the surfaces 2, 102 and 3, 103 of the first panel segment 150 and if the sidewalls 8, 108 of a second and adjacent curved panel segment 150 are parallel and perpendicular to each other, and normal to the surfaces 2, 102 and 3, 103 of the second panel segment 150, then the sidewalls 8, 108 of the first segment 150 will not be parallel or perpendicular to the sidewalls 8, 108 of the adjacent segment 150. Essentially, that will result in adjacent segments 150 meeting at an angle. It will also result in the endpoints of braces 14, 114 in adjacent segments 150 being out of alignment with each other.

If adjacent segments 150 meet at an angle, a gap between segments 150 will result. It will typically be desirable to fill this gap. The inventor contemplates using a wedge shaped joint 151 to fill the gap and join adjacent segments 150 together. Joint 151 and segments 150 may be joined together using adhesives, welding, mechanical fasteners, or other conventional fastening techniques. Materials used for joint 151 will vary depending upon the intended application of panel 1, 101 and segments 150, their relative expansion characteristics, and etc. However, in general the inventor contemplates that joint 151 will be formed of material that is stronger than the material of the rest of panel 1, 101. For example, when segments 150 are formed from plastic, joint 151 may be steel or aluminum. By tying adjacent segments 150 to joint 151, it will be appreciated that joint 151 will allow forces to be transferred from the buttresses, braces and sidewalls of one segment 150 to the buttresses, braces and sidewalls of the adjacent segments 150, thereby allowing loads to be distributed throughout panel 1, 101 though panel 1, 101 be made of several segments.

Figure 13:
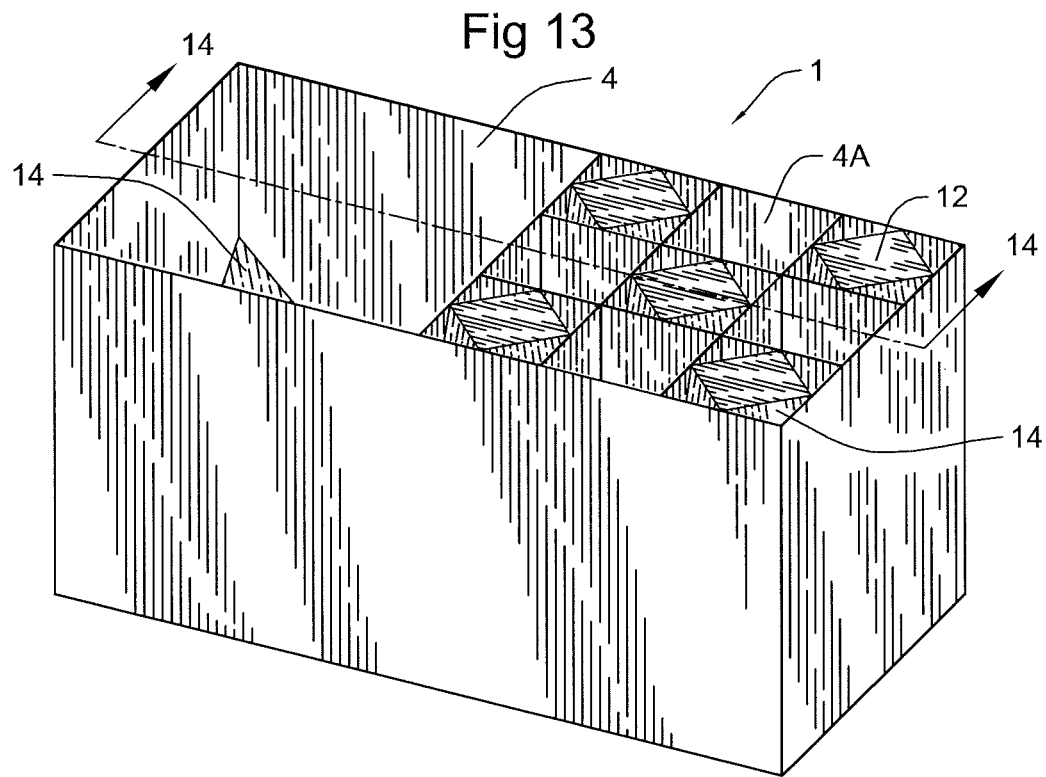
FIG. 13 is a perspective view of a preferred embodiment of a panel constructed with cuboid sections, showing a preferred transition from large sections to small sections.
Figure 13A:
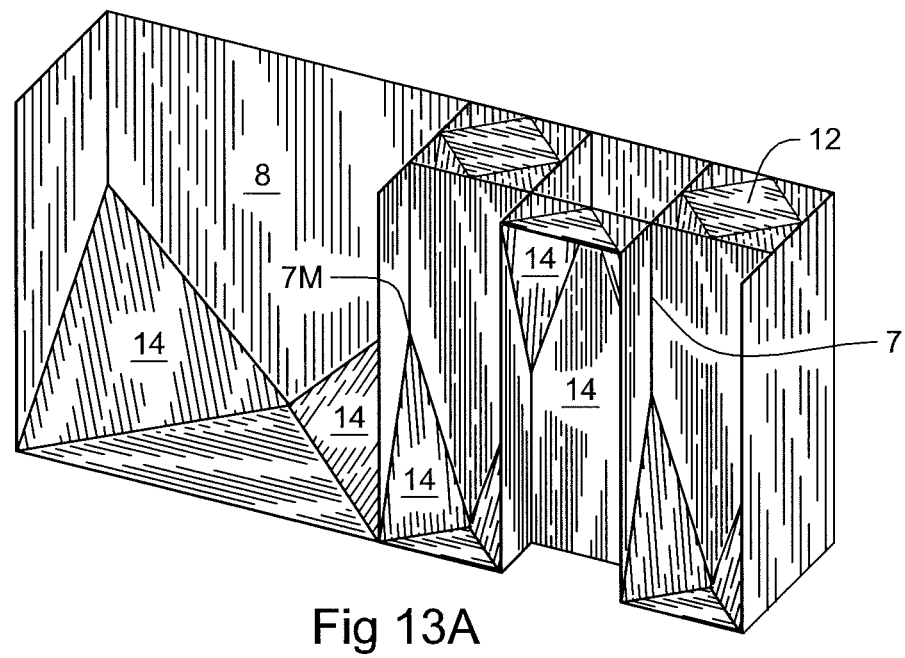
FIG. 13A is a perspective, partial cut-away view of a preferred embodiment of a panel constructed with cuboid sections, showing a preferred transition from large sections to small sections.

Cuboid section 4 may be varied in size to facilitate curving panel 1 or to provide greater or lesser strength, as needed. When cuboid sections 4 are varied in size, this will create a relatively lower density portion of panel 1 comprising the larger sections 4 and a higher density portion of panel 1 containing the smaller sections 4A. The sections 4, 4A will ideally be varied in a 1:9 ratio. That is, adjacent to a section 4 of standard size will be nine smaller sections 4A. Smaller sections 4A will preferably have the same alternating orientation as sections 4. This will ensure that the braces 14 of buttresses 11 in the low density portion of panel 1 will all meet at least one alternately oriented brace 14A at a corner 7 at the transition. See, FIG. 13.

Figure 14:
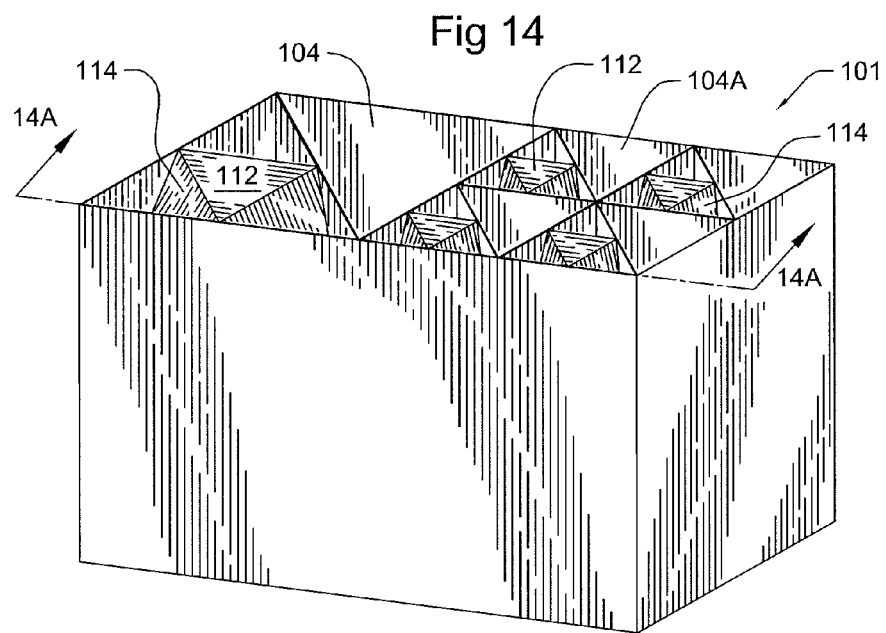
FIG. 14 is a perspective view of a preferred embodiment of a panel constructed with prismatic sections, showing a preferred transition from large sections to small sections.
Figure 14A:
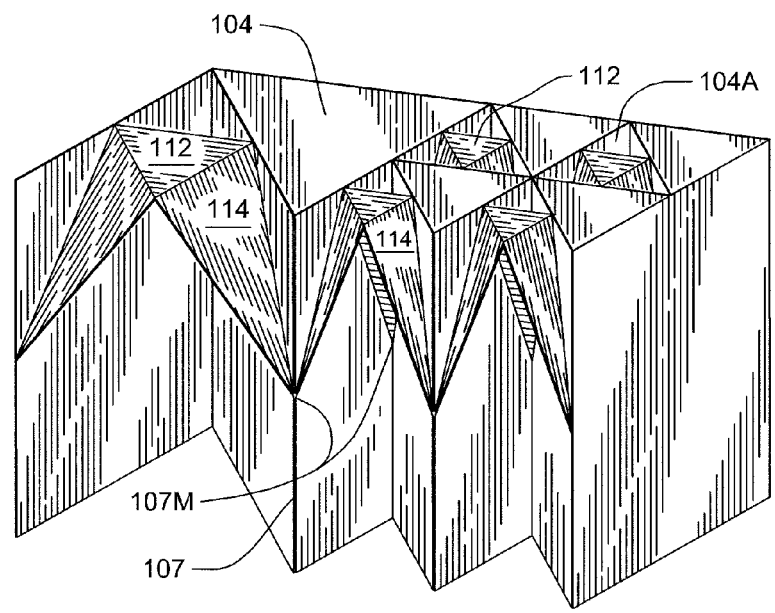
FIG. 14A is a perspective, partial cut-away view of a preferred embodiment of a panel constructed with prismatic sections, showing a preferred transition from large sections to small sections.
Figure 15A:
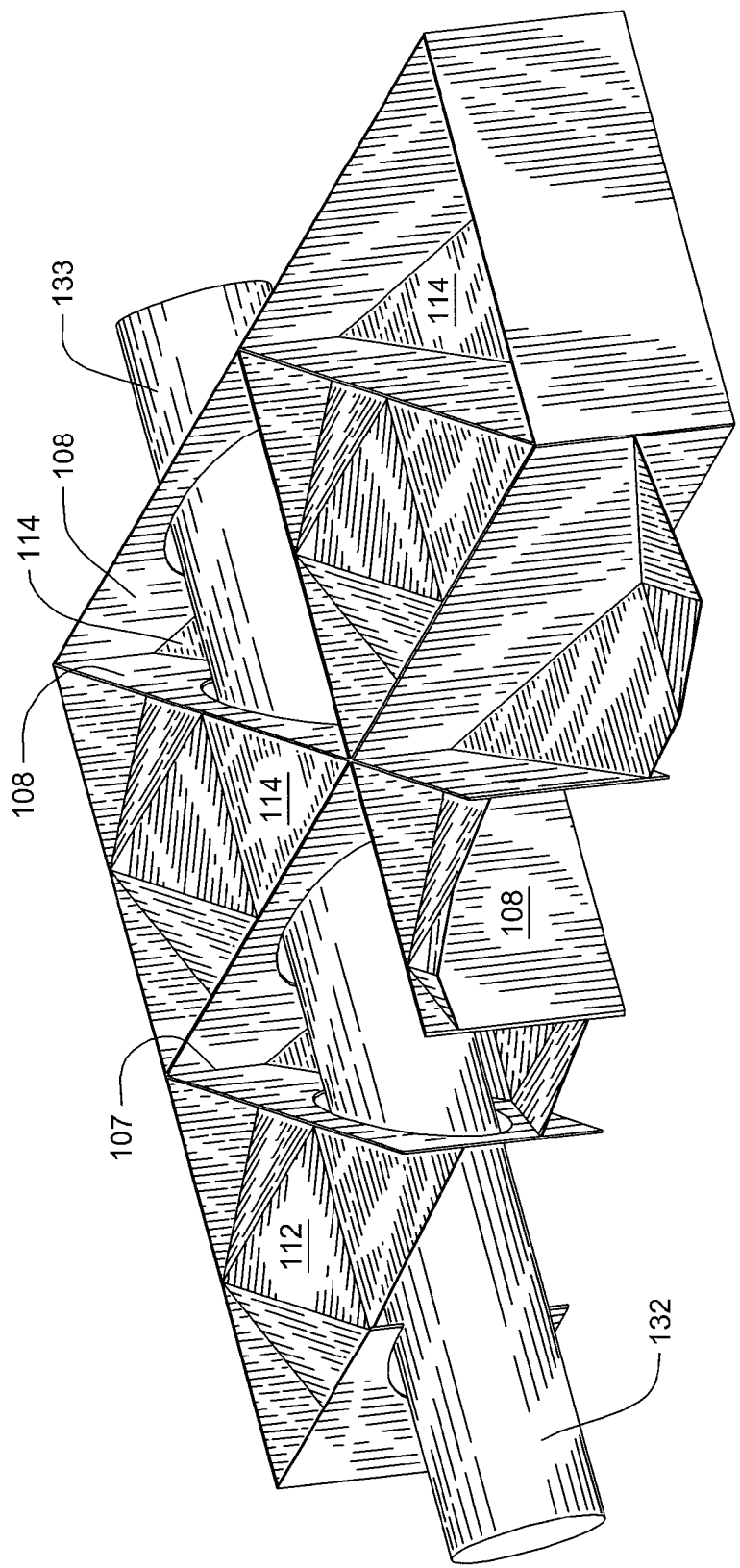
FIG. 15A is a perspective, partial cut-away view of a preferred embodiment of a panel constructed with prismatic sections illustrating apertures and reinforcing rods/conduits running through the panel.
Figure 15B:
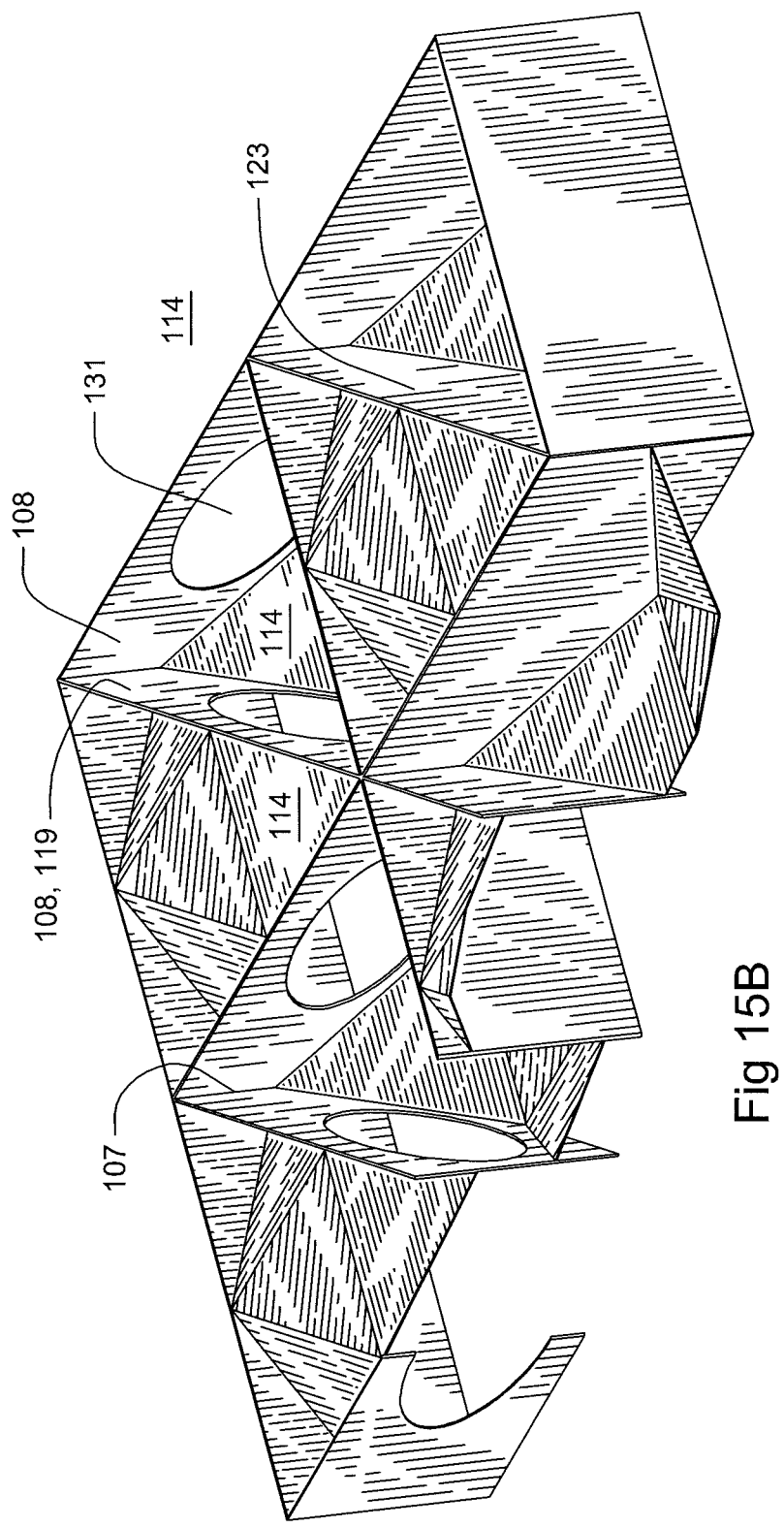
FIG. 15B is a perspective, partial cut-away view of a preferred embodiment of a panel constructed with prismatic sections illustrating apertures in the panel.
Figure 16:
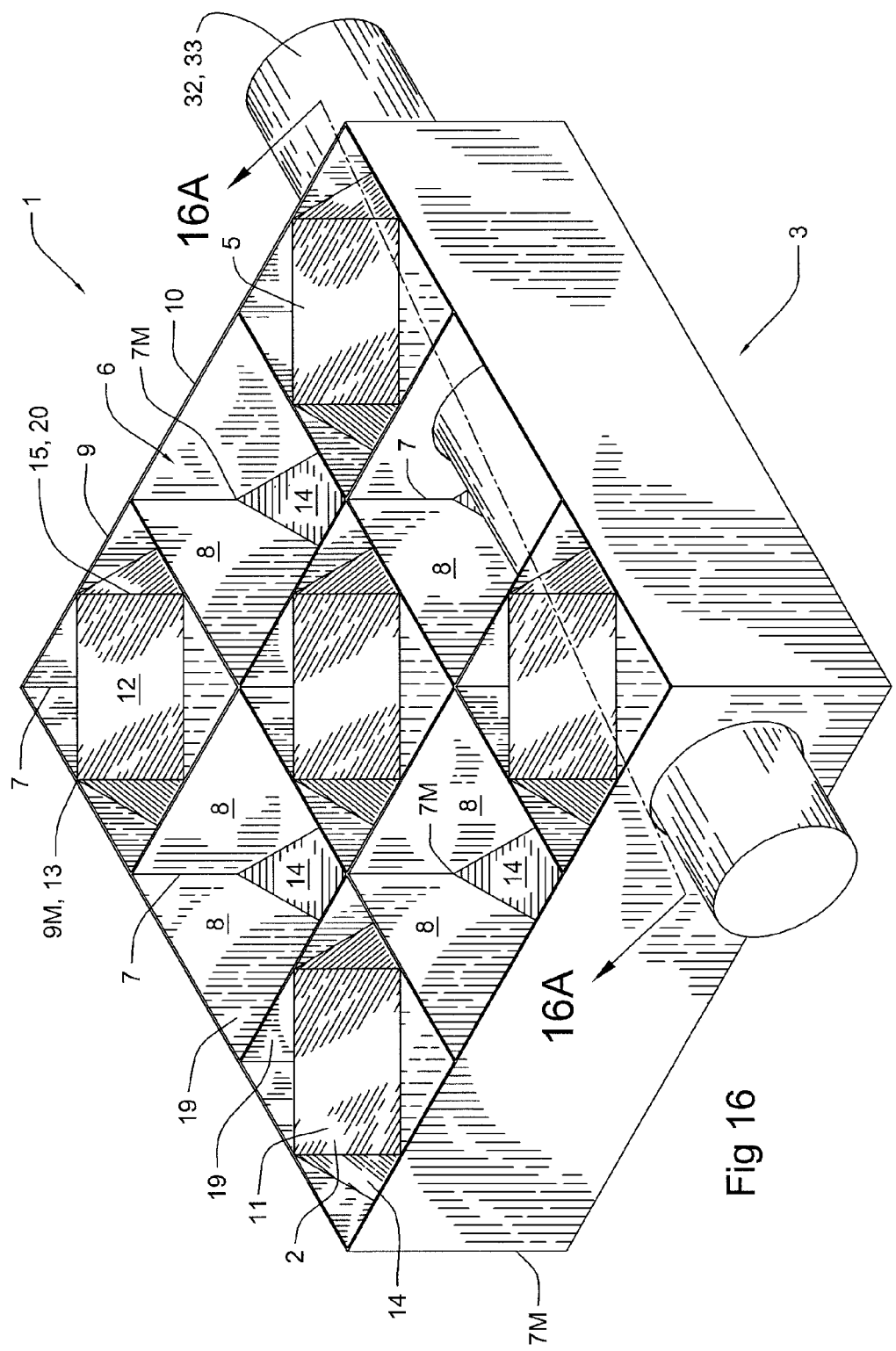
FIG. 16 is a perspective view of a preferred embodiment of a panel constructed with cuboid sections illustrating apertures and reinforcing rods/conduits running through the panel.
Figure 16A:
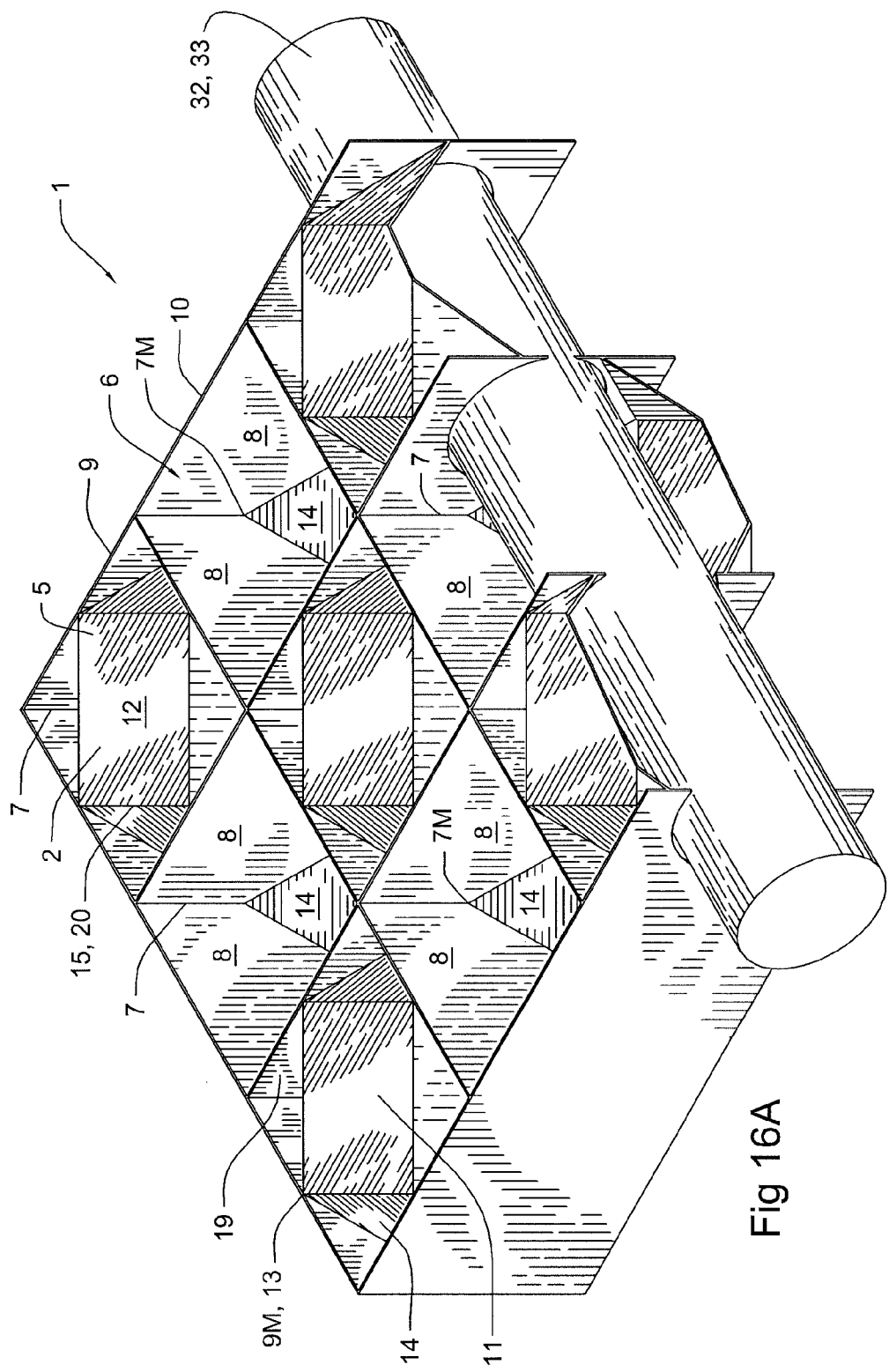
FIG. 16A is a perspective, partial cut-away view of a preferred embodiment of a panel constructed with cuboid sections illustrating apertures and reinforcing rods/conduits running through the panel.
Figure 16B:
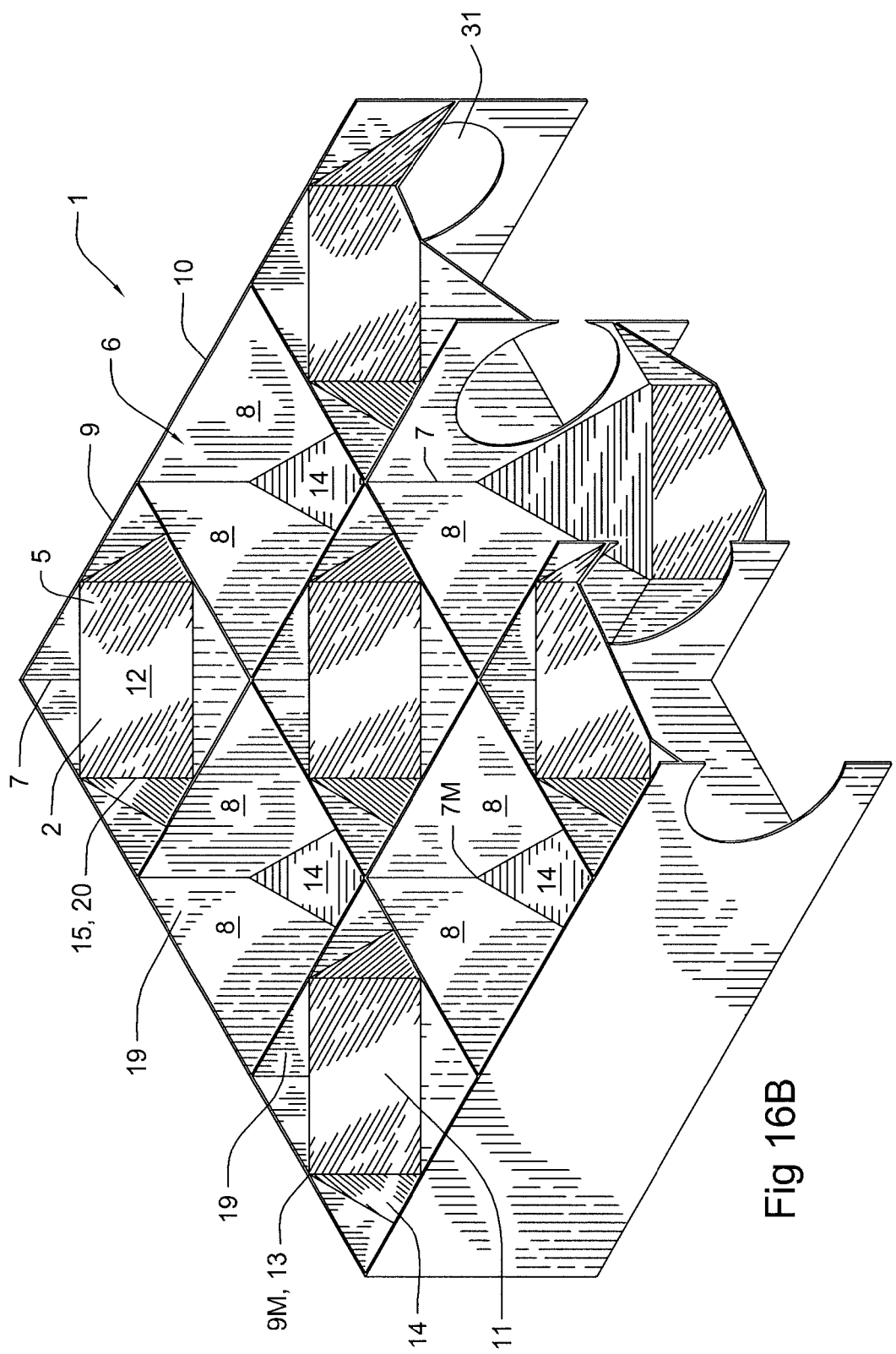
FIG. 16B is a perspective, partial cut-away view of a preferred embodiment of a panel constructed with cuboid sections illustrating apertures in the panel.
Figure 17:
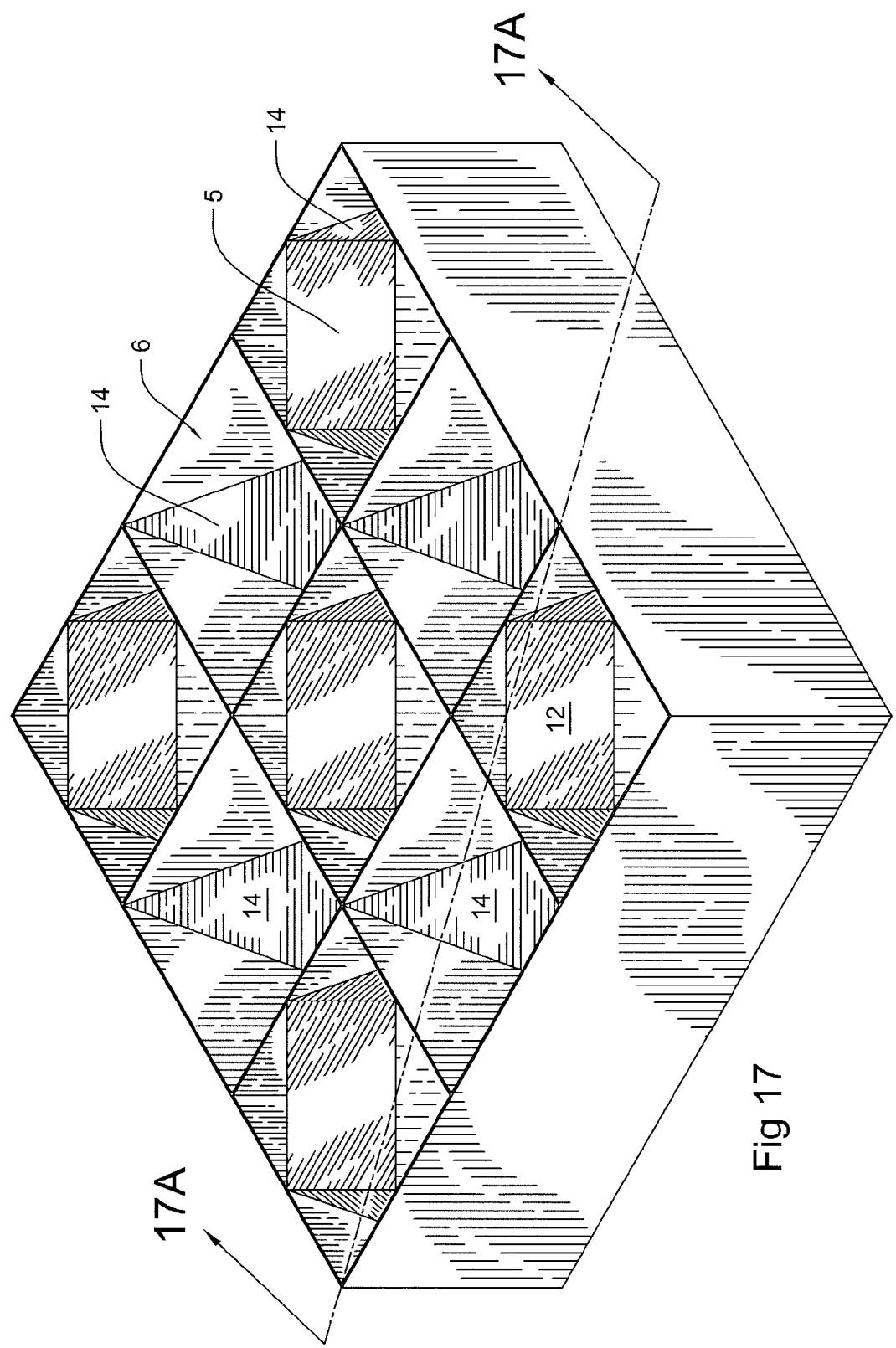
FIG. 17 is a perspective view of a preferred embodiment of a panel constructed with cuboid sections in which the braces extend from the shored face to the free face.
Figure 17A:
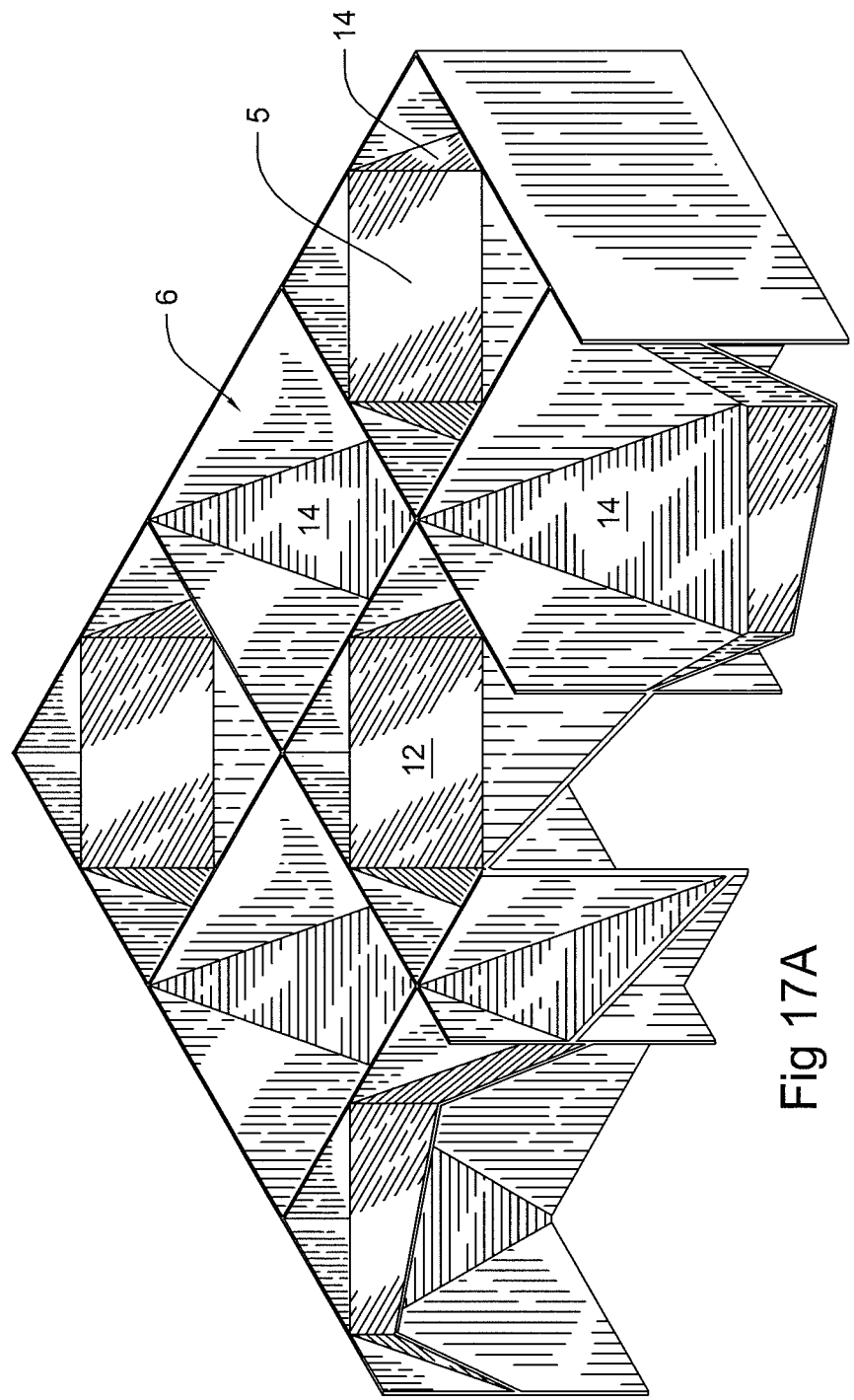
FIG. 17A is a perspective, partial cut-away view of a preferred embodiment of a panel constructed with cuboid sections in which the braces extend from the shored face to the free face.
Figure 18:
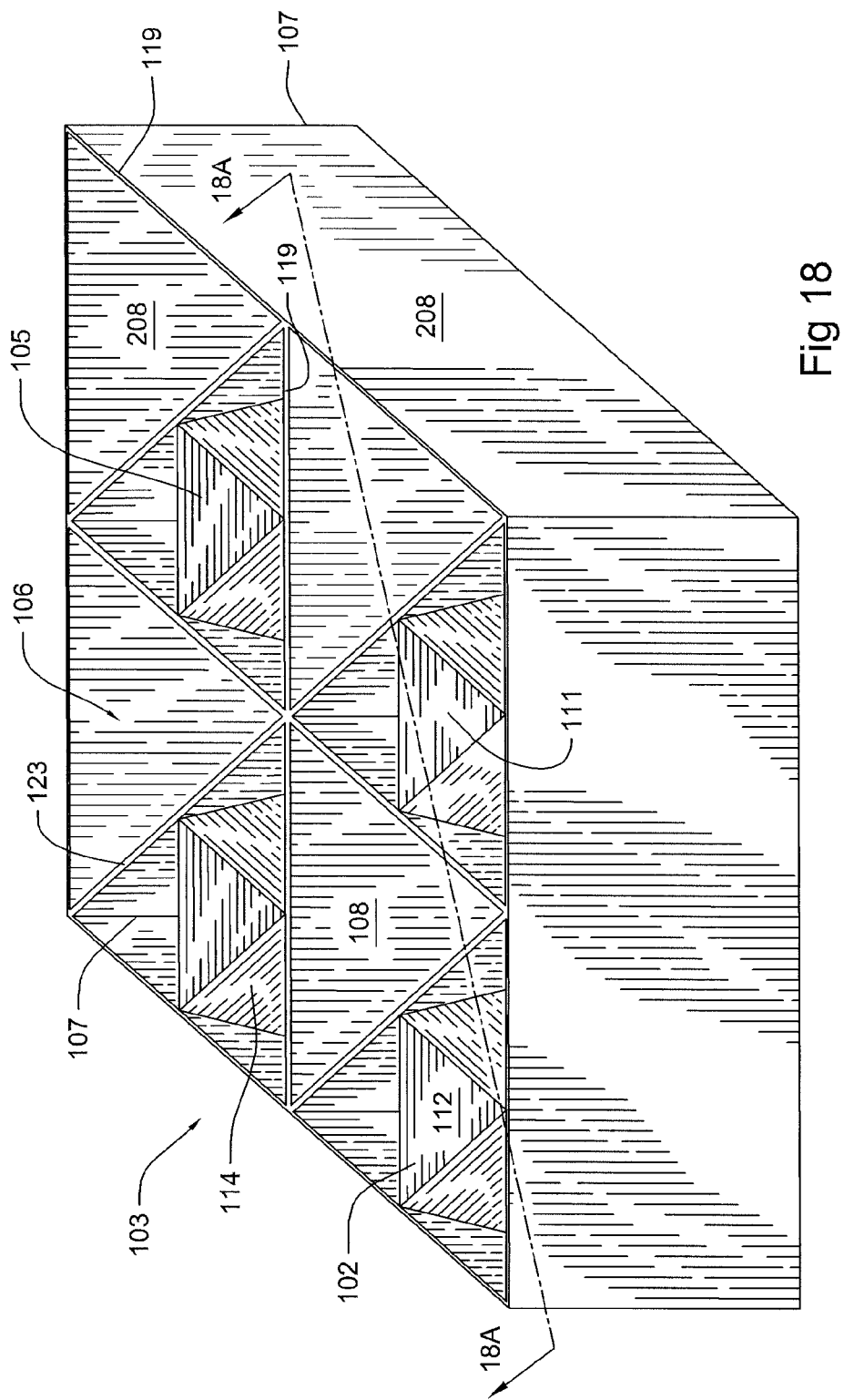
FIG. 18 is a perspective view of a preferred embodiment of a panel constructed with prismatic sections in which the braces extend from the shored face to the free face.
Figure 18A:
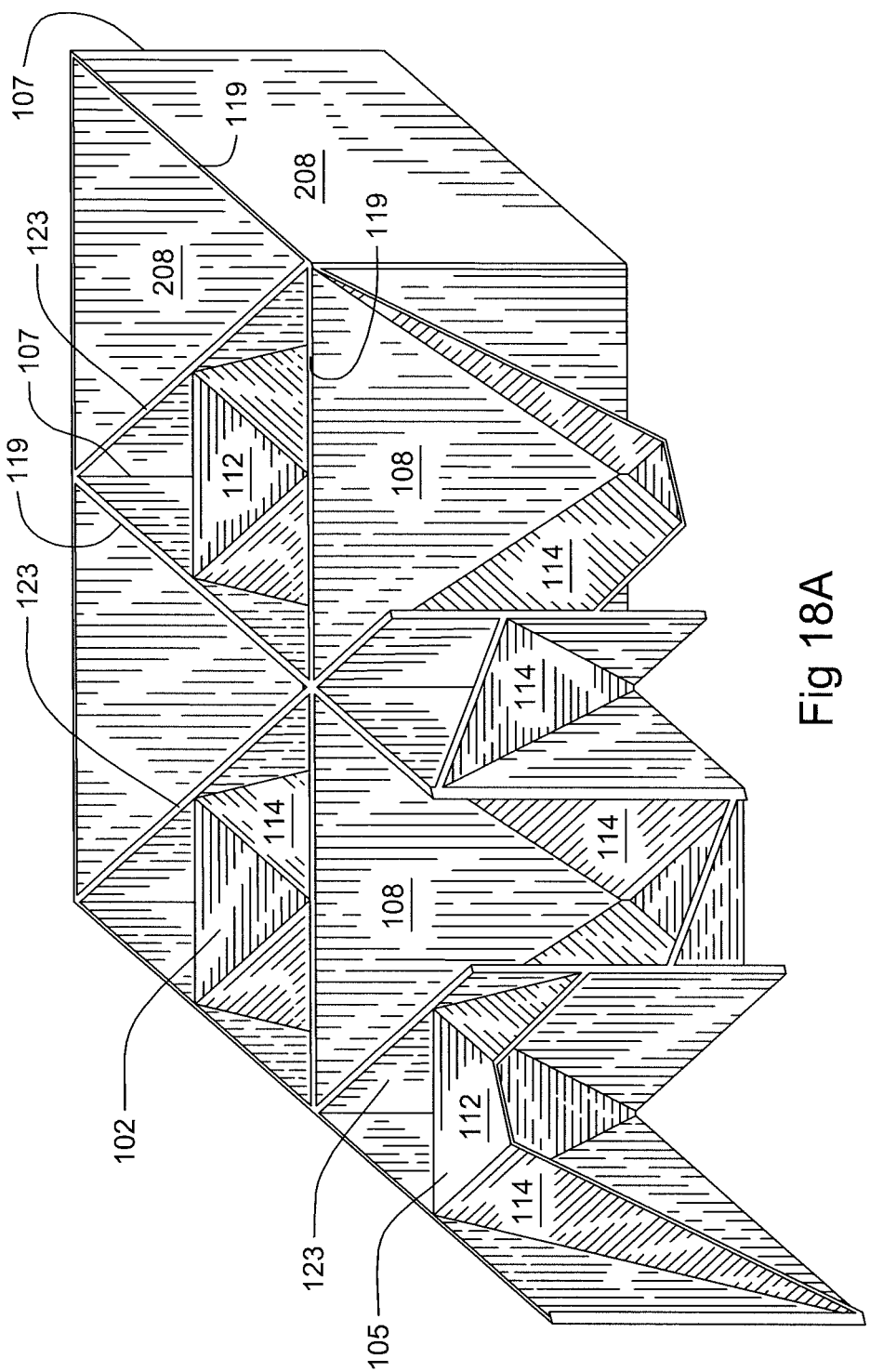
FIG. 18A is a perspective, partial cut-away view of a preferred embodiment of a panel constructed with prismatic sections in which the braces extend from the shored face to the free face.

Similarly, when prismatic sections 104 are varied in size, relatively low density and high density portions of panel 101 will be formed, containing respectively larger sections 104 and smaller sections 104A. However, in the prismatic version of panel 101, sections 104, 104A will ideally be varied in a 1:4 ratio. That is, adjacent to a section 104 of standard size will be four smaller sections 104A. Smaller sections 104A will preferably have the same alternating orientation as sections 104. Again, this will ensure that the braces 114 of buttresses 111 in the low density portion of panel 101 will all meet at least one alternately oriented brace 114A at a corner 107 at the transition. See, FIG. 14.

Both embodiments of panel 1, 101 may be used to construct any structure where high strength and low density is important, either because of weight concerns or for reasons of economy. Examples include skis; surfboards; shelving; construction panels for buildings, aircraft, spacecraft, automobiles, boats, and etc. It will be appreciated that panels 1, 101 may be joined together as desired in order to form more complex structures. If desirable in the particular application, specific or general purpose fillers 301 may be added to some or all of the void spaces in panel 1, 101. Examples of filler material include sound dampening material such as polyether urethane or fire retardant materials such as asbestos, phenolic based foams, and gypsum sand. A laminated surface 302 may be applied over the upper and/or lower surfaces 2, 102 and 3, 103 of panel 1, 101 for aesthetic, structural, aerodynamic, hydrodynamic, or other reasons, as desired.

Panels 1, 101 will preferably be made using molds suited for injection molding or other similar molding processes. Once closed, the mold be filled with plastic, rubber, foam, cement, steel, aluminum, or any other moldable material. Once the material has hardened and/or cured, the mold will open leaving the desired high strength low density panel 1, 101. It should be appreciated from the foregoing that, although panels 1, 101 are described above as an assembly of individual sections, 4, 104, in the preferred embodiment, panels 1, 101 will be a unitary composite in which each section 4, 104 will merge seamlessly into its neighbors.

Although the invention has been described in terms of its preferred embodiment, other embodiments will be apparent to those of skill in the art from a review of the foregoing. Those embodiments as well as the preferred embodiments are intended to be encompassed by the scope and spirit of the following claims.

I claim:

1. A high strength low density panel having an upper face opposite a lower face, said panel comprising:
   a. a plurality of substantially hollow sections, each said substantially hollow section having a shored face opposite a second face and four corners extending between said shored face and said second face;
   b. each said substantially hollow section having four sidewalls of substantially continuous material, each said sidewall extending from each corner to an adjacent corner; each said sidewall further extending from a shored border substantially coplanar with said shored face to a second border substantially coplanar with said second face; wherein each border has a midpoint and wherein each corner has a midpoint;
   c. each said substantially hollow section having a buttress comprising a rectangular sheet of material positioned substantially coplanar with said shored face, wherein said rectangular sheet has four corners and wherein each corner of said rectangular sheet joins one of said shored borders at about the midpoint of said shored border; each buttress further comprising a plurality of braces, each brace extending from two adjacent corners of said rectangular sheet to the one of said section corners positioned between said adjacent corners of said rectangular sheet.

2. A high strength low density panel according to claim 1 wherein each said brace extending from said two adjacent corners of said rectangular sheet extends to about said midpoint of said one of said section corners positioned between said adjacent corners of said rectangular sheet.

3. A high strength low density panel according to claim 2 wherein said substantially hollow sections are positioned in said panel in rows and columns.

4. A high strength low density panel according to claim 3 wherein said substantially hollow sections are positioned relative to each other so that the sidewalls of one substantially hollow section join with the sidewalls of each adjacent substantially hollow section, whereby an interlocking plurality of braces is created across said panel.

5. A high strength low density panel according to claim 4 wherein said interlocking plurality of braces comprise two sets of substantially parallel braces.

6. A high strength low density panel according to claim 5 wherein said sets of braces are substantially perpendicular.

7. A high strength low density panel according to claim 2 wherein said buttress braces are substantially triangular.

8. A high strength low density panel according to claim 7 wherein said plurality of triangular braces extend along and are connected to adjacent sidewalls of said substantially hollow section.

9. A high strength low density panel according to claim 8 wherein said sidewalls further comprise a plurality of aligned apertures.

10. A high strength low density panel according to claim 9 further comprising a substantially rigid rod extending through said aligned apertures, whereby said rod will reinforce said panel.

11. A high strength low density panel according to claim 10 wherein said rod is substantially hollow, whereby said rod will serve as a conduit through said panel.

12. A high strength low density panel according to claim 11 wherein said rod is positioned to pass through substantially no buttress braces.

13. A high strength low density panel according to claim 1 wherein said second face is a free face, having no buttress.

14. A high strength low density panel according to claim 13 wherein said substantially hollow sections are oriented relative to each other in an alternating pattern whereby each substantially hollow section adjacent to a substantially hollow section with a shored face proximate to the upper face of the panel will have a free face proximate to the upper face of the panel.

15. A high strength low density panel according to claim 14 wherein each substantially hollow section cater-corner to a substantially hollow section with a shored face proximate to the upper face of the panel will have a shored face proximate to the upper face of the panel.

16. A high strength low density panel according to claim 15 wherein said substantially hollow sections are arranged relative to each other so that each section corner internal to the panel will be shared by four substantially hollow sections.

17. A high strength low density panel according to claim 16 wherein a triangular brace from each of said four substantially hollow sections sharing said corner will meet said corner at about the same point.

18. A high strength low density panel according to claim 1 wherein said substantially hollow sections are filled with sound dampening material.

19. A high strength low density panel according to claim 1 wherein said substantially hollow sections are filled with flame retardant material.

20. A high strength low density panel according to claim 1 further comprising a laminated surface covering said upper face of said panel.

21. A high strength low density panel according to claim 1 wherein said panel has areas of relatively higher and lower density, wherein said areas of higher density are comprised of a portion of said plurality of substantially hollow sections and wherein said areas of lower density are comprised of another portion of said plurality of substantially hollow sections, wherein all said sections have a perimeter and wherein the perimeter of said sections comprising said area of relatively higher density have perimeters that are smaller than the sections comprising said area of relatively lower density.

22. A high strength low density panel according to claim 21 wherein said perimeters of said sections comprising said area of relatively lower density are sized relative to said perimeters of said sections comprising said area of relatively higher density in a ratio of about 1:9.

23. A high strength low density panel according to claim 1 wherein said panel is curved.

\* \* \* \* \*